United States Patent
Dewing et al.

(10) Patent No.: US 9,277,013 B2
(45) Date of Patent: Mar. 1, 2016

(54) STORING LOCAL SESSION DATA AT A USER EQUIPMENT AND SELECTIVELY TRANSMITTING GROUP SESSION DATA TO GROUP SESSION TARGETS BASED ON DYNAMIC PLAYBACK RELEVANCE INFORMATION

(75) Inventors: Shane R. Dewing, San Diego, CA (US); Daniel S. Abplanalp, Salem, OR (US); Samuel K. Sun, San Diego, CA (US); Anthony Pierre Stonefield, San Diego, CA (US); Richard W. Lankford, San Diego, CA (US); Mark A. Lindner, Superior, CO (US)

(73) Assignee: QUALCOMM Incorporated, San Diego, CA (US)

( * ) Notice: Subject to any disclaimer, the term of this patent is extended or adjusted under 35 U.S.C. 154(b) by 635 days.

(21) Appl. No.: 13/468,895

(22) Filed: May 10, 2012

(65) Prior Publication Data
US 2013/0304865 A1   Nov. 14, 2013

(51) Int. Cl.
*G06F 15/173* (2006.01)
*H04L 29/08* (2006.01)
(Continued)

(52) U.S. Cl.
CPC ............... *H04L 67/14* (2013.01); *H04M 1/656* (2013.01); *H04M 3/42221* (2013.01);
(Continued)

(58) Field of Classification Search
CPC ......... H04L 29/08; H04L 67/04; H04L 67/14; H04L 67/2842
USPC .................................................. 709/200, 224
See application file for complete search history.

(56) References Cited

U.S. PATENT DOCUMENTS 7,039,672 B2   5/2006   Wu et al.
7,536,705 B1   5/2009   Boucher et al.
(Continued)

FOREIGN PATENT DOCUMENTS

EP   1087618 A2   3/2001
EP   2239973 A1   10/2010
(Continued)

OTHER PUBLICATIONS

Jin, X. And Chan, S.-H. G. 2010. Detecting malicious nodes in peer-to-peer streaming by peer-based monitoring. ACM Trans. Multimedia Comput. Commun. Appl. 6, 2, Article 9 (Mar. 2010), 18 pages.*
(Continued)

*Primary Examiner* — Anthony Mejia
(74) *Attorney, Agent, or Firm* — Kevin T. Cheatham

(57) ABSTRACT

In an embodiment, a given user equipment (UE) in a local communication session (e.g., a P2P or ad-hoc session) between multiple UEs is designated to record session data. The given UE records the session data exchanged between the multiple UEs during the local communication session and uploads the recorded session data to a server after the local communication session has terminated. In another embodiment, a session controller (e.g., a remote server or a P2P node) receives multiple media feeds from multiple transmitting UEs, and selectively interlaces subsets of the multiple media feeds into interlaced output feed(s) that are transmitted to target UE(s). The target UE(s) provide feedback which permits the session controller to determine a lowest relevant configuration (LRC) for the target UE(s) that is used to regulate the interlaced output feed(s) transmitted thereto.

10 Claims, 16 Drawing Sheets

(51) Int. Cl.

| | |
|---|---|
| *H04M 1/656* | (2006.01) |
| *H04M 3/42* | (2006.01) |
| *H04W 24/08* | (2009.01) |
| *H04W 8/18* | (2009.01) |
| *H04W 84/22* | (2009.01) |
| *H04W 76/02* | (2009.01) |

(52) U.S. Cl.
CPC .............. *H04W 24/08* (2013.01); *H04L 67/04* (2013.01); *H04L 67/2842* (2013.01); *H04W 8/186* (2013.01); *H04W 76/023* (2013.01); *H04W 84/22* (2013.01)

(56) References Cited

U.S. PATENT DOCUMENTS

| | | | |
|---|---|---|---|
| 7,664,861 B2 * | 2/2010 | Guntupalli et al. ........... 709/227 |
| 7,966,636 B2 | 6/2011 | Arseneau |
| 8,015,283 B2 * | 9/2011 | Seidel ........................... 709/224 |
| 8,082,303 B2 * | 12/2011 | Laroia et al. .................. 709/204 |
| 8,352,585 B2 * | 1/2013 | Hu et al. ....................... 709/223 |
| 8,379,090 B1 | 2/2013 | Pearson et al. |
| 8,694,587 B2 | 4/2014 | Chaturvedi et al. |
| 2001/0010546 A1 | 8/2001 | Chen |
| 2001/0052006 A1 * | 12/2001 | Barker et al. ................. 709/223 |
| 2003/0189589 A1 | 10/2003 | LeBlanc |
| 2003/0210329 A1 | 11/2003 | Aagaard et al. |
| 2004/0032495 A1 | 2/2004 | Ortiz |
| 2004/0116141 A1 | 6/2004 | Loven et al. |
| 2004/0125776 A1 * | 7/2004 | Haugli et al. ................. 370/338 |
| 2004/0207724 A1 | 10/2004 | Crouch et al. |
| 2004/0230651 A1 | 11/2004 | Ivashin |
| 2005/0004916 A1 * | 1/2005 | Miller et al. .................... 707/10 |
| 2005/0021744 A1 * | 1/2005 | Haitsuka et al. ............. 709/224 |
| 2005/0160396 A1 * | 7/2005 | Chadzynski .................. 717/103 |
| 2005/0198139 A1 | 9/2005 | Malkin et al. |
| 2006/0073843 A1 | 4/2006 | Aerrabotu et al. |
| 2006/0104347 A1 | 5/2006 | Callan et al. |
| 2006/0161671 A1 * | 7/2006 | Ryman et al. ................. 709/230 |
| 2006/0174203 A1 | 8/2006 | Jung et al. |
| 2007/0018952 A1 | 1/2007 | Arseneau et al. |
| 2007/0106810 A1 * | 5/2007 | Ryman ......................... 709/230 |
| 2007/0106811 A1 * | 5/2007 | Ryman ......................... 709/230 |
| 2007/0162605 A1 * | 7/2007 | Chalasani et al. ............ 709/227 |
| 2007/0279494 A1 | 12/2007 | Aman et al. |
| 2008/0013546 A1 * | 1/2008 | Bhatt et al. ................ 370/395.52 |
| 2008/0013916 A1 | 1/2008 | Sharpe et al. |
| 2008/0051081 A1 * | 2/2008 | Nelson ....................... 455/432.3 |
| 2008/0080392 A1 | 4/2008 | Walsh et al. |
| 2008/0158366 A1 | 7/2008 | Jung et al. |
| 2009/0021576 A1 | 1/2009 | Linder et al. |
| 2009/0119406 A1 * | 5/2009 | Zhu et al. ..................... 709/228 |
| 2009/0132822 A1 * | 5/2009 | Chen ............................. 713/171 |
| 2009/0276522 A1 * | 11/2009 | Seidel ........................... 709/224 |
| 2010/0146092 A1 * | 6/2010 | Hu et al. ....................... 709/223 |
| 2010/0203876 A1 | 8/2010 | Krishnaswamy |
| 2010/0274815 A1 | 10/2010 | Vanasco |
| 2010/0323669 A1 * | 12/2010 | Maggenti et al. ............. 455/413 |
| 2010/0332220 A1 * | 12/2010 | Hursey et al. ................. 704/201 |
| 2011/0055627 A1 * | 3/2011 | Zawacki et al. ................ 714/15 |
| 2011/0161654 A1 * | 6/2011 | Margolis et al. .............. 713/150 |
| 2011/0182225 A1 | 7/2011 | Song et al. |
| 2011/0183655 A1 | 7/2011 | Cao et al. |
| 2011/0235520 A1 | 9/2011 | Maciej et al. |
| 2012/0151046 A1 * | 6/2012 | Weiss et al. ................... 709/224 |
| 2012/0151047 A1 * | 6/2012 | Hodges et al. ................ 709/224 |
| 2012/0190403 A1 | 7/2012 | Myers et al. |
| 2013/0071085 A1 * | 3/2013 | Ryman et al. ................. 386/230 |
| 2013/0111015 A1 * | 5/2013 | Bauchot et al. ............... 709/224 |
| 2013/0232198 A1 * | 9/2013 | Tenbrock ...................... 709/204 |
| 2013/0300821 A1 | 11/2013 | Lankford et al. |
| 2013/0301624 A1 | 11/2013 | Sun et al. |
| 2013/0304865 A1 * | 11/2013 | Dewing et al. ................ 709/219 |
| 2014/0181298 A1 * | 6/2014 | Wang et al. ................... 709/224 |

FOREIGN PATENT DOCUMENTS

| | | |
|---|---|---|
| GB | 2473059 A | 3/2011 |
| JP | 2005309751 A | 11/2005 |
| JP | 2011081431 A | 4/2011 |
| WO | 2010110216 A1 | 9/2010 |
| WO | 2011075119 A1 | 6/2011 |

OTHER PUBLICATIONS

International Search Report and Written Opinion—PCT/US2013/039416, International Search Authority—European Patent Office, Nov. 28, 2013.

Partial International Search Report—PCT/US2013/039416—ISA/EPO—Aug. 7, 2013.

* cited by examiner

STORING LOCAL SESSION DATA AT A USER EQUIPMENT AND SELECTIVELY TRANSMITTING GROUP SESSION DATA TO GROUP SESSION TARGETS BASED ON DYNAMIC PLAYBACK RELEVANCE INFORMATION

BACKGROUND OF THE INVENTION

1. Field of the Invention

Embodiments relate to storing local session data at a user equipment and selectively transmitting session data to group session targets based on dynamic playback relevance information.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data, Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

Performance within wireless communication systems can be bottlenecked over a physical layer or air interface, and also over wired connections within backhaul portions of the systems.

SUMMARY

In an embodiment, a given user equipment (UE) in a local communication session (e.g., a P2P or ad-hoc session) between multiple UEs is designated to record session data. The given UE records the session data exchanged between the multiple UEs during the local communication session and uploads the recorded session data to a server after the local communication session has terminated. In another embodiment, a session controller (e.g., a remote server or a P2P node) receives multiple media feeds from multiple transmitting UEs, and selectively interlaces subsets of the multiple media feeds into interlaced output feed(s) that are transmitted to target UE(s). The target UE(s) provide feedback which permits the session controller to determine a lowest relevant configuration (LRC) for the target UE(s) that is used to regulate the interlaced output feed(s) transmitted thereto.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
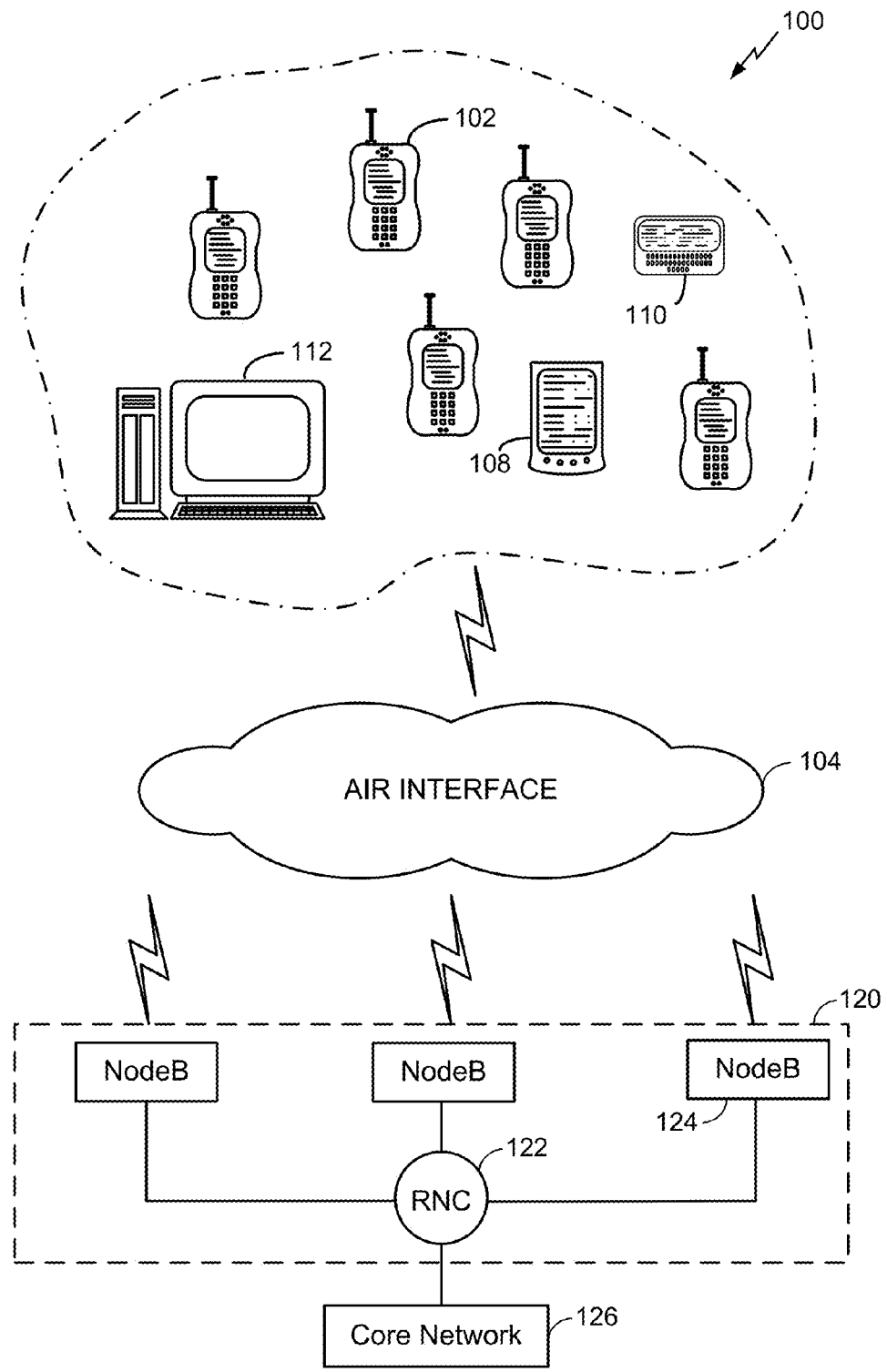
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

As used herein the term interlace, interlaced or interlacing as related to multiple video feeds correspond to stitching or assembling the images or video in a manner to produce a video output feed including at least portions of the multiple video feeds to form for example, a panoramic view, composite image, and the like.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant or tablet computer 108, a pager or laptop 110, which is shown here as a two-way text pager, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal," "AT," "wireless device," "client device," "mobile terminal," "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2:
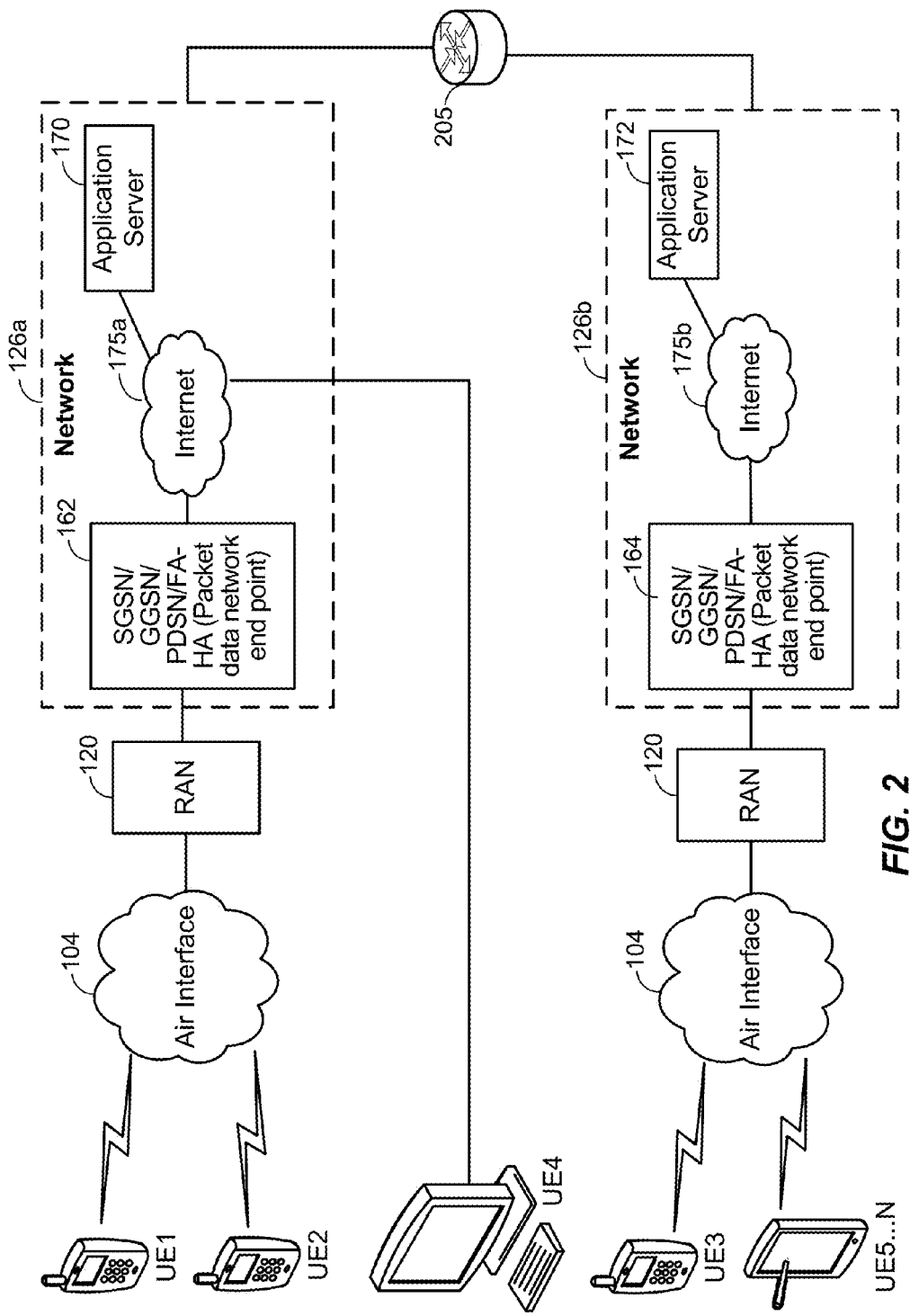
FIG. 2 illustrates a core network according to an embodiment of the present invention.

FIG. 2 illustrates an example of the wireless communications system 100 of FIG. 1 in more detail. In particular, referring to FIG. 2, UEs 1 . . . N are shown as connecting to the RAN 120 at locations serviced by different packet data network end-points. The illustration of FIG. 2 is specific to W-CDMA systems and terminology, although it will be appreciated how FIG. 2 could be modified to conform with various other wireless communications protocols (e.g., LTE, EV-DO, UMTS, etc.) and the various embodiments are not limited to the illustrated system or elements.

UEs 1 and 2 connect to the RAN 120 at a portion served by a portion of the core network denoted as 126a, including a first packet data network end-point 162 (e.g., which may correspond to SGSN, GGSN, PDSN, a home agent (HA), a foreign agent (FA), PGW/SGW in LTE, etc.). The first packet data network end-point 162 in turn connects to the Internet 175a, and through the Internet 175a, to a first application server 170 and a routing unit 205. UEs 3 and 5 . . . N connect to the RAN 120 at another portion of the core network denoted as 126b, including a second packet data network end-point 164 (e.g., which may correspond to SGSN, GGSN, PDSN, FA, HA, etc.). Similar to the first packet data network end-point 162, the second packet data network end-point 164 in turn connects to the Internet 175b, and through the Internet 175b, to a second application server 172 and the routing unit 205. The core networks 126a and 126b are coupled at least via the routing unit 205. UE 4 connects directly to the Internet 175 within the core network 126a (e.g., via a wired Ethernet connection, via a WiFi hotspot or 802.11b connection, etc., whereby WiFi access points or other Internet-bridging mechanisms can be considered as an alternative access network to the RAN 120), and through the Internet 175 can then connect to any of the system components described above.

Referring to FIG. 2, UEs 1, 2 and 3 are illustrated as wireless cell-phones, UE 4 is illustrated as a desktop computer and UEs 5 . . . N are illustrated as wireless tablets- and/or laptop PCs. However, in other embodiments, it will be appreciated that the wireless communication system 100 can connect to any type of UE, and the examples illustrated in FIG. 2 are not intended to limit the types of UEs that may be implemented within the system.

Figure 3A:
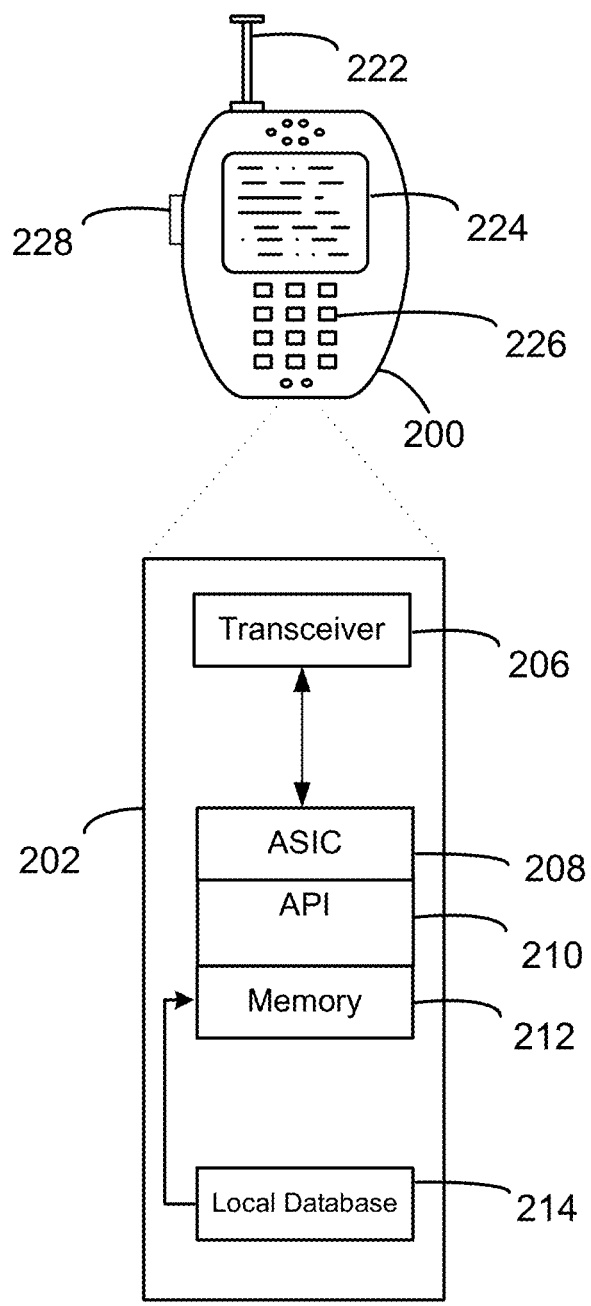
FIG. 3A is an illustration of a user equipment (UE) in accordance with at least one embodiment of the invention.

Referring to FIG. 3A, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3A are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), 3GPP Long Term Evolution (LTE) or other protocols that may be used in a wireless communications network or a data communications network. Accordingly, the illustrations provided herein are not intended to limit the embodiments of the invention and are merely to aid in the description of aspects of embodiments of the invention.

Figure 3B:
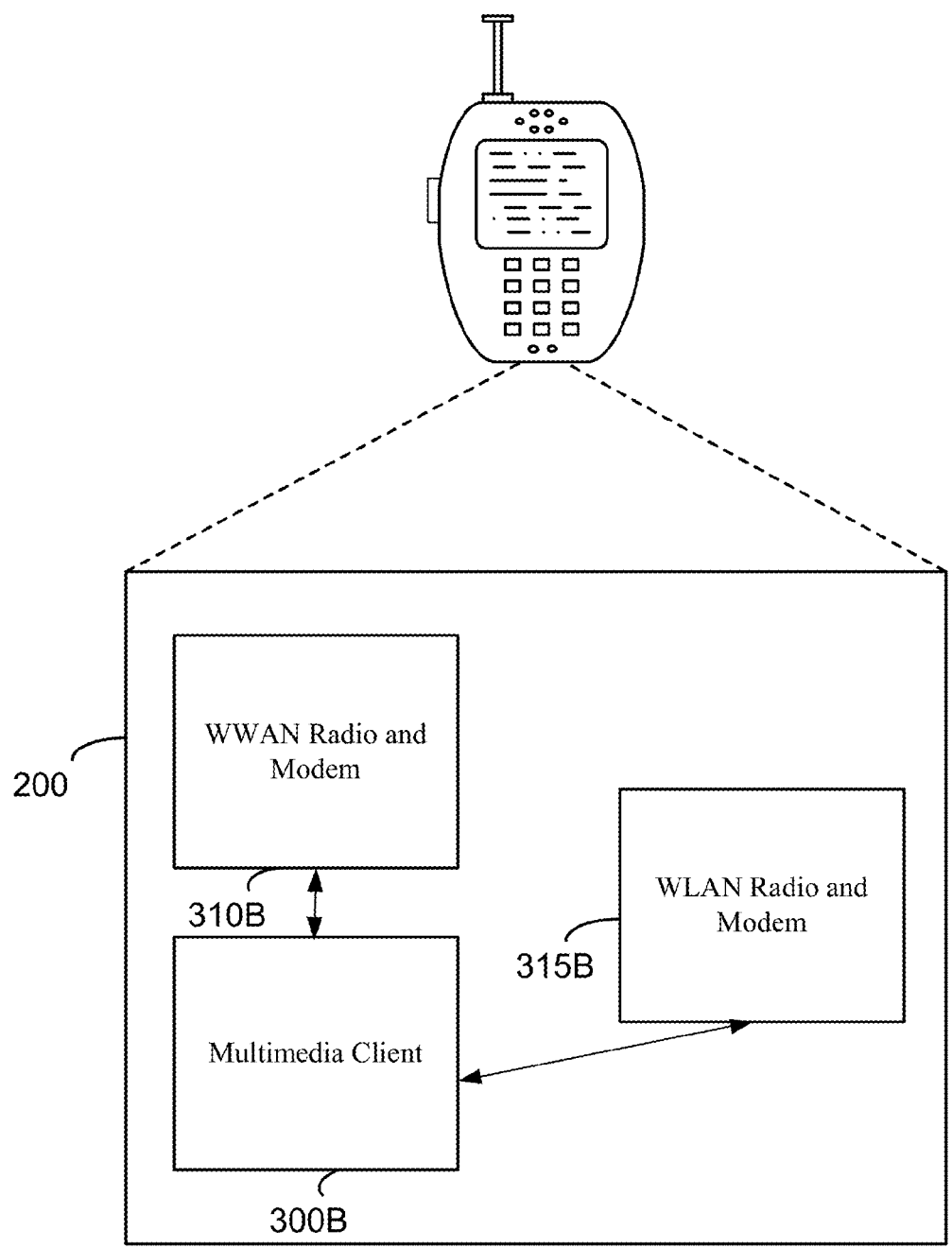
FIG. 3B illustrates software and/or hardware modules of the UE in accordance with another embodiment of the invention.

FIG. 3B illustrates software and/or hardware modules of the UE 200 in accordance with another embodiment of the invention. Referring to FIG. 3B, the UE 200 includes a multimedia client 300B, a Wireless Wide Area Network (WWAN) radio and modem 310B and a Wireless Local Area Network (WLAN) radio and modem 315B.

Referring to FIG. 3B, the multimedia client 300B corresponds to a client that executes on the UE 200 to support communication sessions (e.g., VoIP sessions, PTT sessions, PTX sessions, etc.) that are arbitrated by the application server 170 or 172 over the RAN 120, whereby the RAN 120 described above with respect to FIGS. 1 through 2 forms part of a WWAN. The multimedia client 300B is configured to support the communication sessions over a Personal Area Network (PAN) and/or WLAN via the WLAN radio and modem 315B.

Referring to FIG. 3B, the WWAN radio and modem 310B corresponds to hardware of the UE 200 that is used to establish a wireless communication link with the RAN 120, such as a wireless base station or cellular tower. In an example, when the UE 200 can establish a good connection with the application server 170, the application server 170 can be relied upon to partially or fully arbitrate the UE 200's communication sessions such that the multimedia client 300B can interact with the WWAN radio and modem 310B (to connect to the application server 170 via the RAN 120) to engage in the communication session.

The WLAN radio and modem 315B corresponds to hardware of the UE 200 that is used to establish a wireless communication link directly with other local UEs to form a PAN (e.g., via Bluetooth, WiFi, etc.), or alternatively connect to other local UEs via a local access point (AP) (e.g., a WLAN AP or router, a WiFi hotspot, etc.). In an example, when the UE 200 cannot establish an acceptable connection with the application server 170 (e.g., due to a poor physical-layer and/or backhaul connection), the application server 170 cannot be relied upon to fully arbitrate the UE 200's communication sessions. In this case, the multimedia client 300B can attempt to support a given communication session (at least partially) via a PAN using WLAN protocols (e.g., either in client-only or arbitration-mode).

Figure 4:
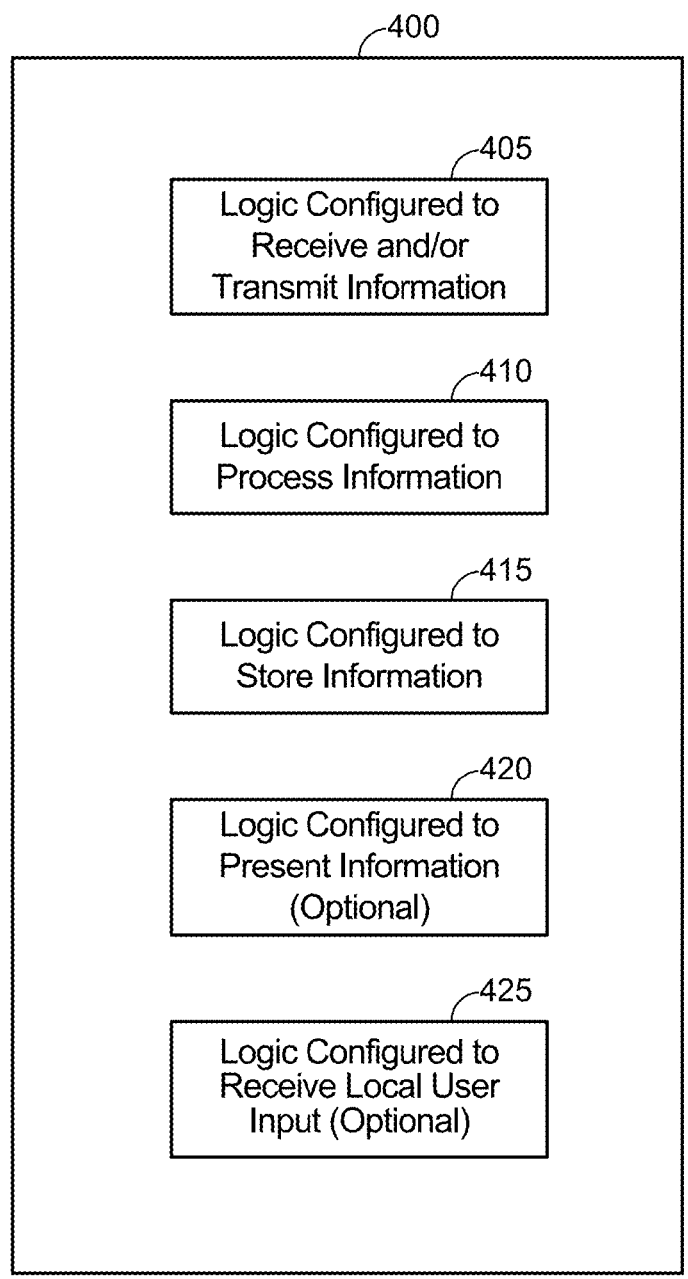
FIG. 4 illustrates a communication device that includes logic configured to perform functionality.

FIG. 4 illustrates a communication device 400 that includes logic configured to perform functionality. The communication device 400 can correspond to any of the above-noted communication devices, including but not limited to UEs 102, 108, 110, 112 or 200, Node Bs or base stations 120, the RNC or base station controller 122, a packet data network end-point (e.g., SGSN, GGSN, a Mobility Management Entity (MME) in Long Term Evolution (LTE), etc.), any of the servers 170 or 172, etc. Thus, communication device 400 can correspond to any electronic device that is configured to communicate with (or facilitate communication with) one or more other entities over a network.

Referring to FIG. 4, the communication device 400 includes logic configured to receive and/or transmit information 405. In an example, if the communication device 400 corresponds to a wireless communications device (e.g., UE 200, Node B 124, etc.), the logic configured to receive and/or transmit information 405 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175a or 175b can be accessed, etc.). Thus, if the communication device 400 corresponds to some type of network-based server (e.g., SGSN, GGSN, application servers 170 or 172, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 200 as shown in FIG. 3A, the logic configured to present information 420 can include the display 224. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 200 as shown in FIG. 3A, the logic configured to receive local user input 425 can include the display 224 (if implemented a touch-screen), keypad 226, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5A:
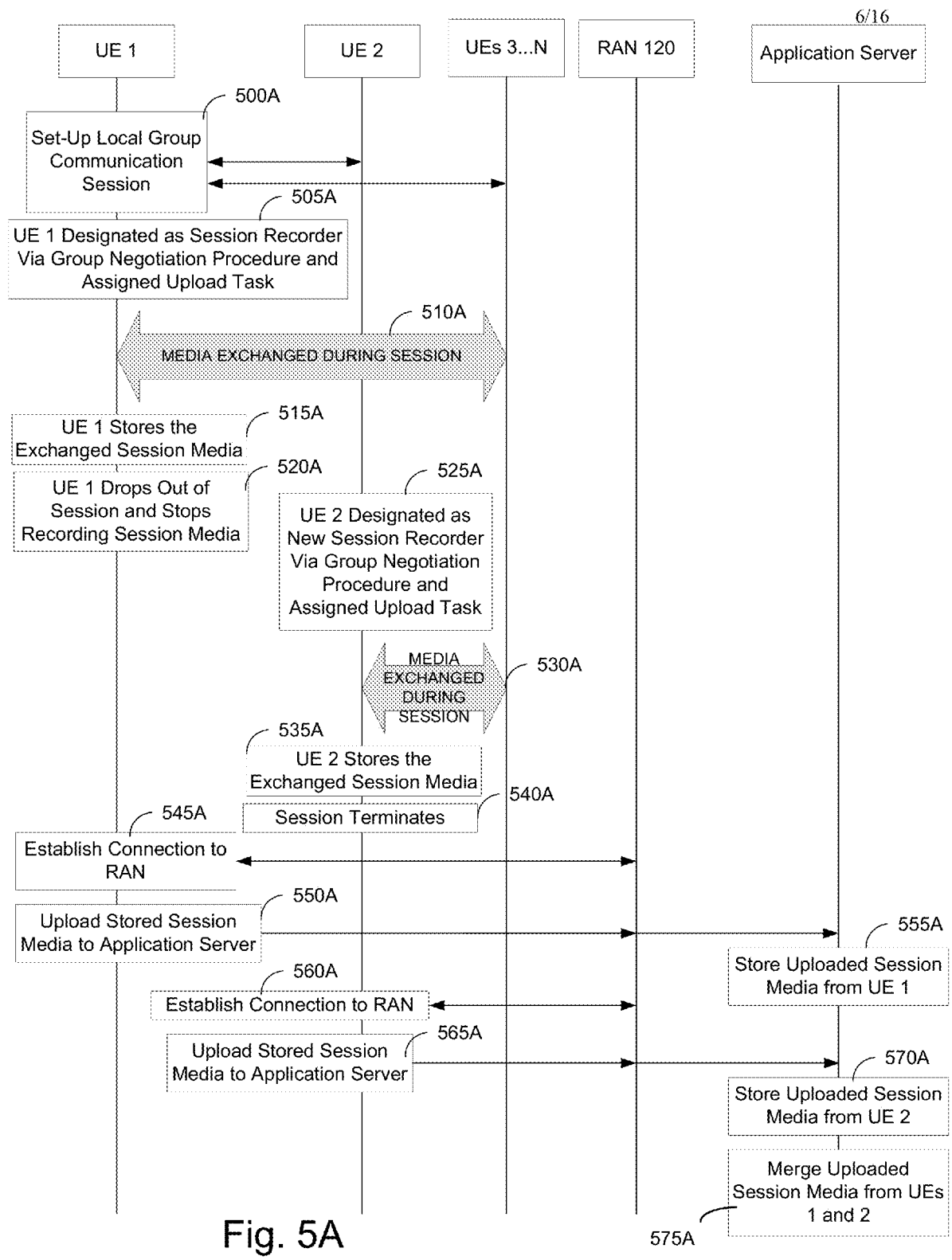
FIG. 5A illustrates a process of storing local session data within a personal area network (PAN) in accordance with an embodiment of the present invention.

FIG. 5A illustrates a process of storing local session data within a PAN in accordance with an embodiment of the present invention. Referring to FIG. 5A, an originating UE ("UE 1") sets up a local communication session with UEs 2 . . . N (e.g., whereby N≥2) by establishing a PAN, 500A. For example, UE 1's decision to set-up the local communication session (or a session that is not arbitrated by a remote server such as application server 170) can be based upon a failed attempt to set-up the communication session via server arbitration (e.g., UE 1 may fail to successfully connect to the RAN 120, or alternatively UE 1 may connect to the RAN 120 but then fail to connect from the RAN 120 to the application server 170 if the network backhaul is slow or backlogged). Alternatively, UE 1's decision to set-up the local communication session without server arbitration can be related to bandwidth conservation even where the application server 170 is available for arbitrating the communication session (e.g., UE 1 will use the application server 170 if connected to a relatively fast WiFi hotspot but will revert to local PAN-based sessions if connected to slow WWANs such as 1×, congested or inconsistent WiFi, etc.).

During set up of the local communication session over the PAN in 500A, UEs 1 . . . N engage in a negotiation procedure in order to designate a recording function to one or more of the participating UEs, 505A. In an example, UEs 1 . . . N may attempt to figure out which participating UE has the highest local storage availability so that the recording function is assigned thereto. In another example, UEs 1 . . . N may attempt to figure out which participating UE has access to the fastest and/or cheapest data plan, so that the selected UE will be expected to upload the recorded media at a later point in time in the most efficient and/or least expensive manner. In 505A of FIG. 5A, assume that the negotiation procedure results in UE 1 being designated as an initial session recorder, whereby UE 1 is assigned an upload task to upload the stored session data at a later point in time upon obtaining a suitable connection to the application server 170. Thus, if UE 2 is capturing high-definition (HD) video but would not have sufficient memory to store the HD video itself for an extended period of time, UE 2 can "borrow" UE 1's memory by sending the HD video to UE 1 over the PAN with UE 1 storing the HD video and being responsible for uploading the HD video on behalf of UE 2 at a later point in time. In this case, the local communication session can be established specifically for the purpose of recording the HD video, as opposed to establishing the local communication session to present the HD video with the subsequent upload being an archiving procedure. For example, if UEs 1 and 2 are operated by users watching a basketball game and the user of UE 2 is actively capturing the basketball game on HD video, the HD video recorded by UE 2 may be sent to UE 1 over the PAN even if UE 1 is in a pocket of his/her user such that UE 1's user is not necessarily viewing UE 2's captured HD video while UE 1 still functions to facilitate storage and subsequent upload of the UE 2's captured HD video.

Figure 5B:
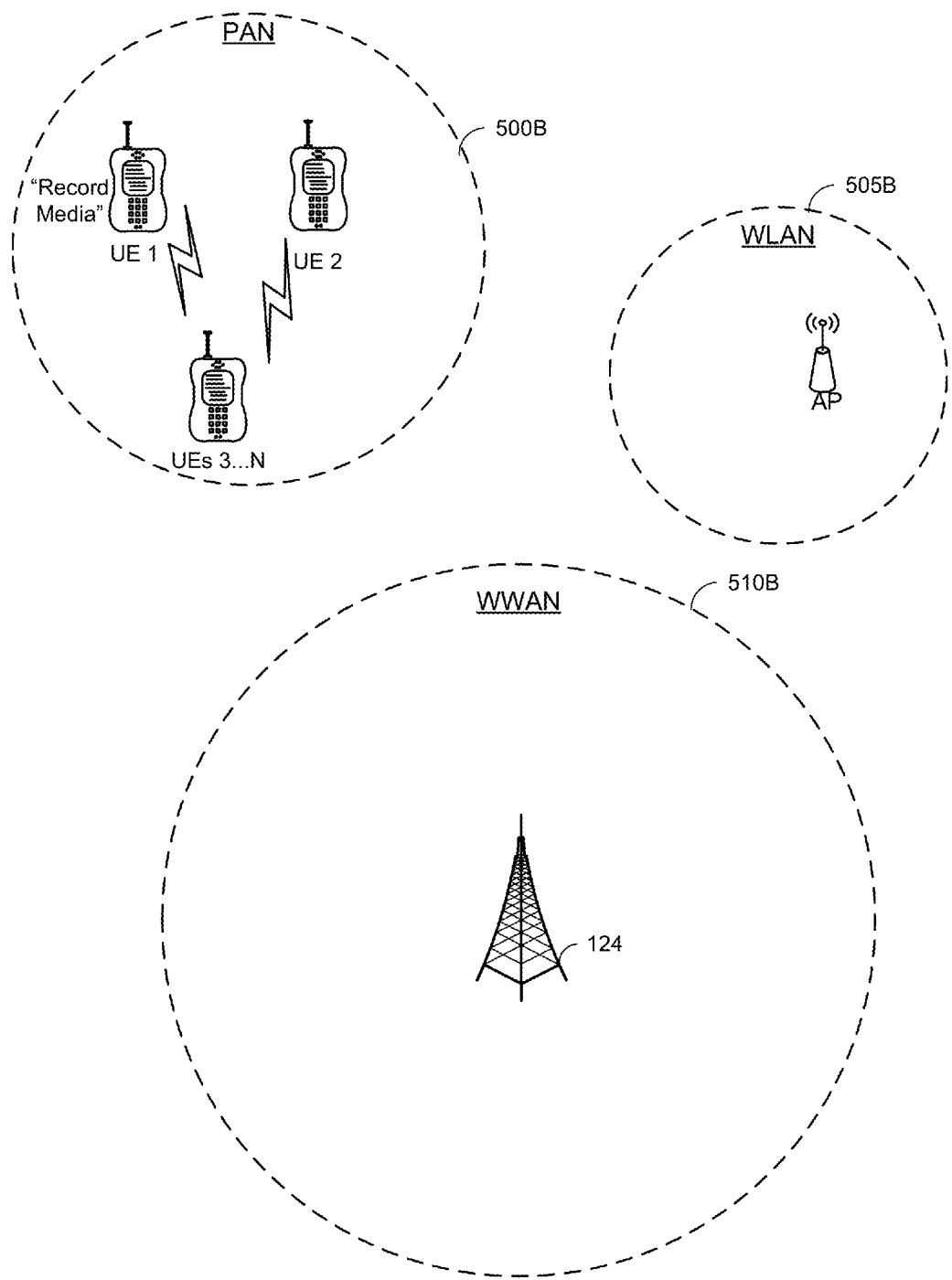
FIG. 5B illustrates an example state of a local communication session during a portion of the process of FIG. 5A in accordance with an embodiment of the present invention.

Next, UEs 1 . . . N engage in the local communication session over the PAN (e.g., UE 2 streams its captured HD video to UE 1 and/or other UEs in the session), 510A, while UE 1 stores at least a portion of the exchanged session data, 515A. In an example, UE 1 does not need to record all of the session data, but could be assigned to record designated portions of the session data (e.g., if 1080 p video is being exchanged, UE 1 could instead re-format and store the video at 720 p, if both video and audio are being exchanged, UE 1 may opt to only store video, etc.). FIG. 5B illustrates an example state of the local communication session at 515A, whereby UEs 1 . . . N communicate via a PAN 500B and are out of range of a nearby WLAN 505B and WWAN 510B, with UE 1 recording the PAN-mediated session data.

Referring to FIG. 5A, at a later point in time, assume that UE 1 drops out of the local communication session and thereby stops recording the session data, 520A. UEs 2 . . . N detect UE 1's exit from the local communication session and engage in another negotiation procedure in order to designate the recording function to one or more of the remaining participating UEs, 525A. In 525A of FIG. 5A, assume that the negotiation procedure results in UE 2 being designated as the new session recorder, whereby UE 2 is assigned an upload task to upload the stored session data at a later point in time upon obtaining a suitable connection to the application server 170. Accordingly, UEs 2 . . . N continue to exchange media over the PAN during the local communication session, 530A, while UE 2 stores at least a portion of the exchanged session data, 535A. Eventually, the local communication session terminates, 540A.

Figure 5C:
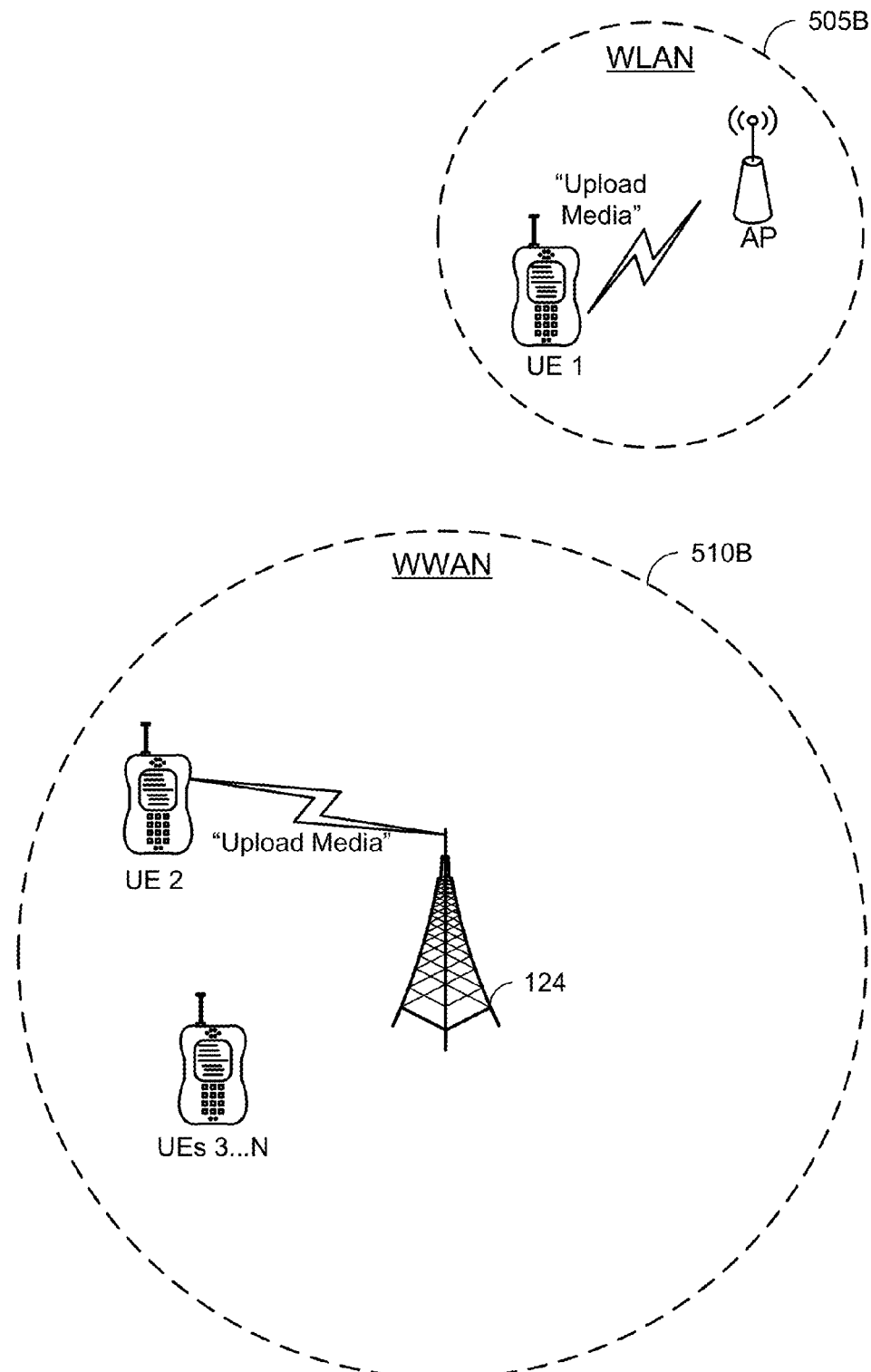
FIG. 5C illustrates an example state of a local communication session during a portion of the process of FIG. 5A in accordance with another embodiment of the present invention.

Referring to FIG. 5A, UE 1 later establishes a connection to the RAN 120, 545A, and UE 1 uses its RAN connection to upload its portion of the recorded session data (recorded at 515A) to the application server 170, 550A, and the application server 170 stores the uploaded session data from UE 1, 555A. UE 2 also later establishes its own connection to the RAN 120, 560A, and UE 2 also uses its RAN connection to upload its portion of the recorded session data (recorded at 525A) to the application server 170, 565A, and the application server 170 stores the uploaded session data from UE 1, 570A. FIG. 5C illustrates an example state of the local communication session between 545A and 570A, whereby UE 2 connects to the application server 170 via the WWAN 510B and UE 1 connects to the application server 170 via the WLAN 505B. Also shown in FIG. 5C are UEs 3 . . . N being in range of the WWAN 510B, but UEs 3 . . . N were not assigned the recording function and/or the upload task during the local communication session such that UEs 3 . . . N need not connect to the WWAN 510B for the purpose of uploading data to the application server 170. Returning to FIG. 5A, the application server 170 merges the disparate recorded session data from UEs 1 and 2, 575A, such that the local communication session can be seamlessly reconstructed (e.g., the respective recorded session data is organized based on its time of capture or recording, overlapping or redundant recorded session data from UEs 1 and 2 is removed, etc.). In the case of an HD video recording session, the recorded HD video at UEs 1 and 2 can be merged so as to produce a single HD video that can be viewed without interruption, so long as UE 2 was buffering the HD video when UE 1 dropped out of the session so as to bridge any time-gap between 520A and 525A.

Figure 6A:
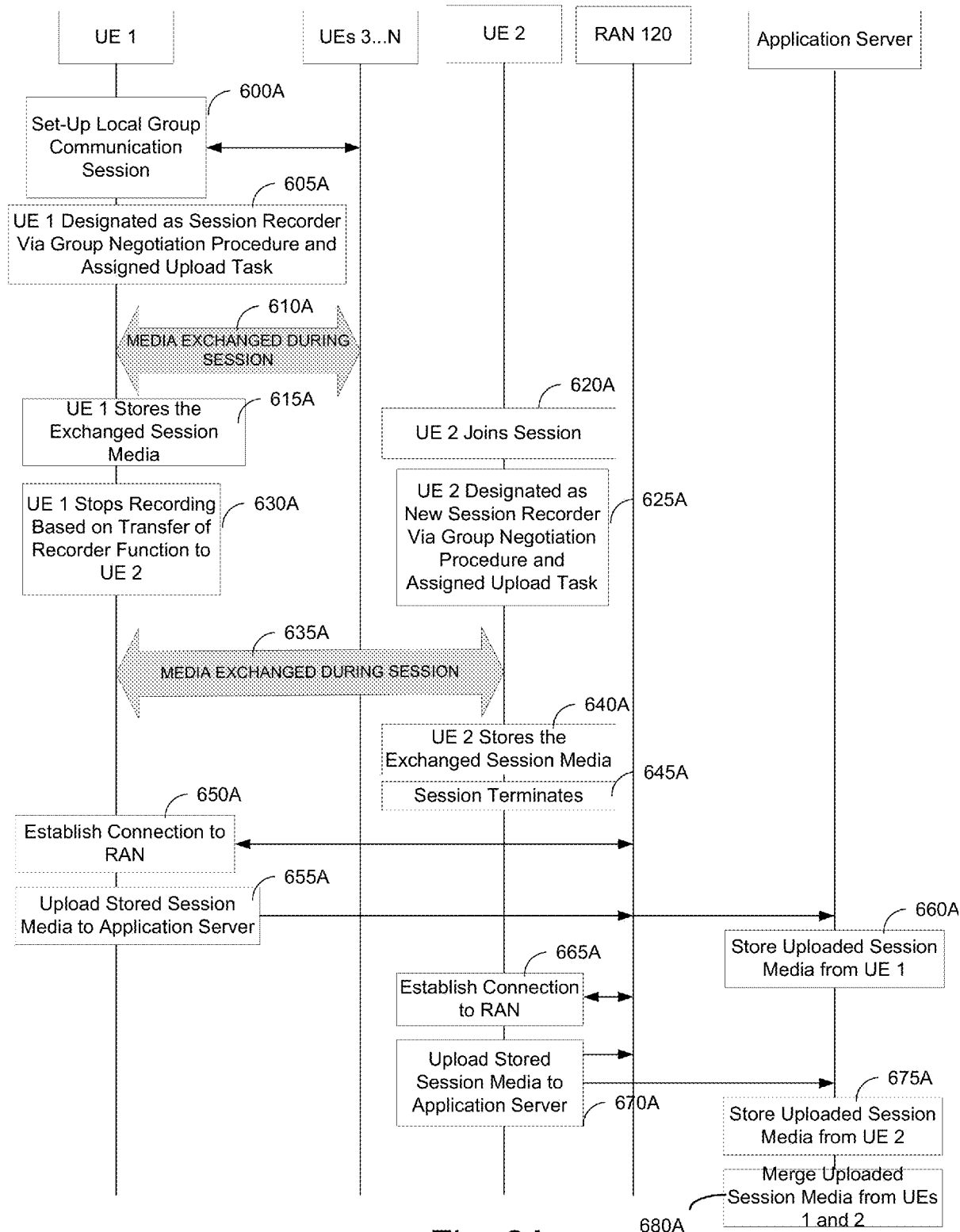
FIG. 6A illustrates another process of storing local session data within a PAN in accordance with an embodiment of the present invention.

FIG. 6A illustrates another process of storing local session data within a PAN in accordance with an embodiment of the present invention. Referring to FIG. 6A, 600A through 615A substantially correspond to 500A through 515A of FIG. 5A, respectively, except that the local communication session in FIG. 6A is initially set-up between UE 1 and UEs 3 . . . N such that UE 2 is not an initial participant in the communication session.

Referring to FIG. 6A, after UE 1 has already been recording the session data for a period of time at 615A, UE 2 joins the local communication session, 620A. After UE 2 joins the local communication session, UEs 1 . . . N engage in another negotiation procedure that results in UE 2 being designated as the new session recorder, whereby UE 2 is assigned an upload task to upload the stored session data at a later point in time upon obtaining a suitable connection to the application server 170, 625A. For example, UE 1 may have initially been deemed the best suited UE to perform the recording function, but the late-joining UE 2 may be deemed even more suitable, thereby prompting the recording function to be transferred thereto after UE 2 joins the session. Thus, while FIG. 5A shows the recording function being transferred as a result of the current session recorder dropping out of the local communication session, FIG. 6A shows an example of the recording function being transferred while the previous session recorder remains in the local communication session as a non-recorder. In yet another example, the recording function could be transferred from UE to UE during an extended session as the respective recordings at the session recorders fills up their available memory, so that the "best" recording device at any particular point in the session can be construed as a shifting or dynamic target.

Referring to FIG. 6A, after the negotiation procedure results in UE 2 being designated as the new session recorder, UE 1 stops recording the session data, 630A. Thereafter, UEs 1 . . . N continue to exchange media over the PAN during the local communication session, 635A, while UE 2 stores at least a portion of the exchanged session data, 640A. Eventually, the local communication session terminates, 645A, after which 650A through 680A substantially correspond to 545A through 575A of FIG. 5A, respectively, and as such will not be described further for the sake of brevity.

Figure 6B:
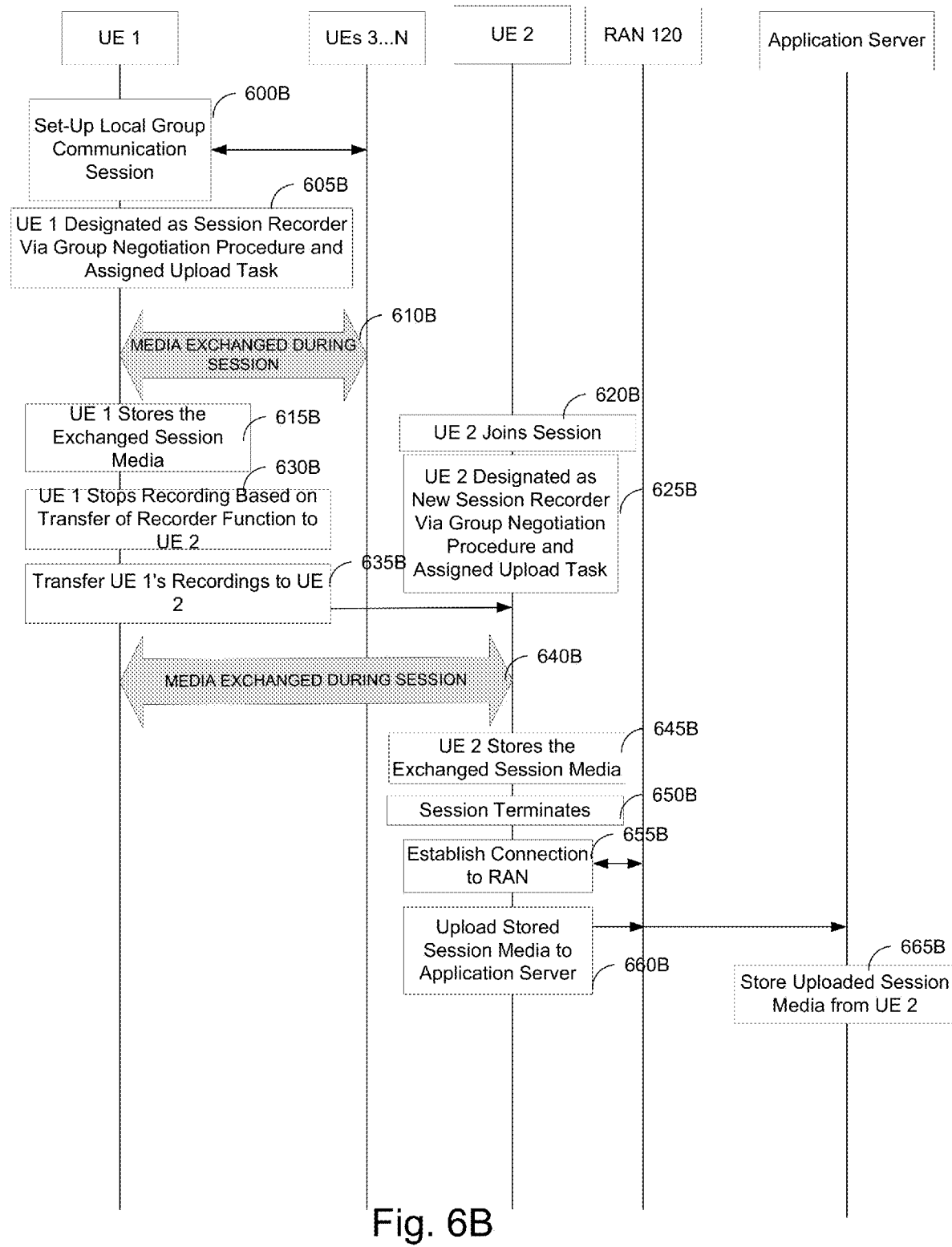
FIG. 6B illustrates another process of storing local session data within a PAN in accordance with another embodiment of the present invention.

FIG. 6B illustrates another process of storing local session data within a PAN in accordance with another embodiment of the present invention. Referring to FIG. 6B, 600B through 630B substantially correspond to 600A through 630A of FIG. 6A, respectively. After UE 2 joins the local communication session and is designated the recording function (620B and 625B), instead of UE 1 merely ceasing its recording activities as in FIG. 6A, UE 1 sends UE 2 the recorded session data over the PAN at 635B. The transfer that occurs at 635B can either occur during the ongoing local communication session while UE 2 is performing the recording function, or alternatively can occur after session termination as a private transfer over the PAN from UE 1 to UE 2. While not shown explicitly in FIG. 6B, the transferred session data from UE 1 can be merged with, or added to, the session data that is recorded by UE 2 such that new recorded session data functions to extend the earlier session data recorded by UE 1. Thus, in the example of an HD video being captured at UE 3, UE 3 begins by sending the HD video to UE 1 for storage and then UE 1 transfers the stored HD video to UE 2 at some point after UE 1 drops out of the session and UE 2 takes over the recording function such that a single UE in the PAN will eventually be storing the entire HD video session.

Referring to FIG. 6B, after the negotiation procedure results in UE 2 being designated as the new session recorder, UEs 1 . . . N continue to exchange media over the PAN during the local communication session, 640B, while UE 2 stores at least a portion of the exchanged session data, 645B. Eventually, the local communication session terminates at 650B. At some later point in time, UE 2 establishes a connection to the RAN 120, 655B, and uploads the stored session data (recorded at both UE 1 and UE 2) to the application server 170 via the RAN connection, 660B. The application server 170 stores the uploaded session data from UE 2, 665B. In example, the merger or reconciliation between the session data stored by UE 1 at 615B and at UE 2 at 645B can occur at the application server 170, similar to 575A of FIG. 5A or 680A of FIG. 6A, such that the upload 660B can be implemented as an upload of two distinct data files. Alternatively, the merger or reconciliation between the session data stored by UE 1 at 615B and at UE 2 at 645B can occur at UE 2 itself, such that the upload 660B can be implemented as an upload of a single merged data file that is representative of the local communication session.

Figure 7:
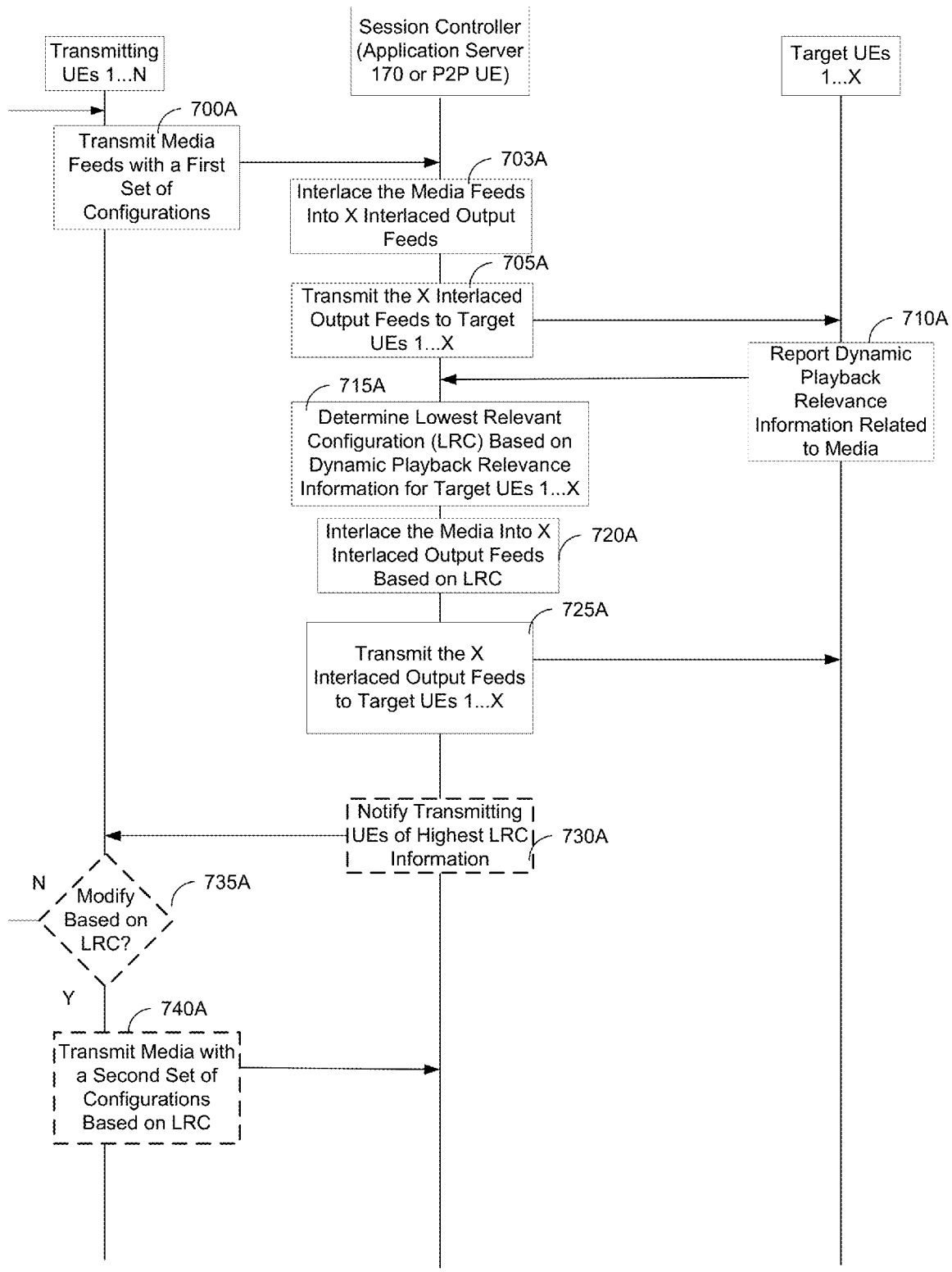
FIG. 7 illustrates a process of selectively transmitting group session media to group session targets based on dynamic playback relevance information in accordance with an embodiment of the invention.

FIG. 7 illustrates a process of selectively transmitting group session media to group session targets based on dynamic playback relevance information in accordance with an embodiment of the invention. Referring to FIG. 7, assume that a set of transmitting UEs 1 . . . N and a set of target UEs 1 . . . X are engaged in a group communication session (i.e., whereby X≥2 and N≥1) that is arbitrated by a session controller. In an embodiment, the session controller can correspond to a network-based communication entity such as the application server 170. In an alternative embodiment, the session controller can correspond to a local UE that communicates with the target UEs 1 . . . X and the transmitting UEs 1 . . . N at least partially via a local ad-hoc or P2P network.

During the group communication session, transmitting UEs 1 . . . N each transmit media feeds with a first set of configurations to the session controller (e.g., the application server 170 over the RAN 120, or an ad-hoc or P2P UE), 700A. The session controller interlaces the media feeds from the transmitting UEs 1 . . . N into X interlaced output feeds for transmission to target UEs 1 . . . X, 703A, and the session controller transmits the X interlaced output feeds to target UEs 1 . . . X, 705A. Each interlaced output feed generated at 703A includes either a set of independent media feeds from the media received at 700A, or a single, composite output feed. For example, the first set of configurations of the media from the transmitting UEs 1 . . . N can include one or more audio and video configurations, one or more video formats (e.g., including resolutions of 720 p and/or 1080 p, a full-screen video format, video with a frame rate of 30 frames per second, etc.), and so on. As will be appreciated, not all of the target UEs 1 . . . X may wish to receive the same groupings of media (or media feeds) from the transmitting UEs 1 . . . N. For example, target UE 1 may receive video feeds from transmitting UEs 1, 2 and 4 along with an audio feed from transmitting UE 2, target UE 2 may wish to receive video feeds from UEs 3 and 4 with no audio feed, and so on. Also, even if certain target UEs 1 . . . X receive the same video feed within their respective interlaced output feeds, for instance, different versions of the video feed may be conveyed to different target UEs (e.g., different resolutions of the same video feed, with some video feeds having their original resolutions down-converted).

The media that is output from the session controller to a particular target UE can thereby contain a plurality of different feeds from different transmitting UEs, and these feeds can be combined together or interlaced to form an "interlaced output feed" that is sent to the particular target UE. As noted above, each independent media feed that is interlaced into a particular interlaced output feed can correspond to an independent stream, such that the interlaced output feed can correspond to a plurality of independent constituent media feeds. In a further example, one or more independent constituent media feeds in a particular interlaced output feed can be downsized from its corresponding source media feed received as part of the first set of configurations at 700A, in an example. Thus, a video feed from transmitting UE 4 may be received at 720 p and a 480 p version of the transmitting UE 4's video feed may be generated by the session controller and then added into the interlaced output feeds for one or more target UEs at 703A.

Referring to FIG. 7, the target UEs 1 . . . X receive the interlaced output feeds from the session controller and, at 710A, report information including (i) the current manner in which the respective target UEs are currently presenting the media feeds from their respective interlaced output feeds from the transmitting UEs 1 . . . N, (ii) a desired or preferred manner that the respective target UEs wish to present the media feeds from their respective interlaced output feeds, (iii) a request that a media feed from one or more of the transmitting UEs 1 . . . N be removed from its respective interlaced output feed and/or (iv) a request that one or more new media feeds be added into its respective interlaced output feed. The above-noted report information inclusive of any combination of (i) through (iv) is referred to hereafter as "dynamic playback relevance information".

Referring to 710A of FIG. 7, in an example where the dynamic playback relevance information includes the current manner in which the respective target UEs are presenting the media feeds from their respective interlaced output feeds as in example (i) of the dynamic playback relevance information for 710A, if the first set of configurations of the media from the transmitting UEs 1 . . . N includes an audio portion from transmitting UE 1, the dynamic playback relevance information may indicate whether the target UEs 1 . . . X are outputting the audio portion from transmitting UE 1 at all or whether the target UEs 1 . . . X are muted, a volume at which the target UEs 2 . . . N are outputting the audio portion from transmitting UE 1 (if un-muted), whether the audio portion from transmitting UE 1 is being outputted via monotone, stereo or surround-sound, whether the audio portion is being outputted via internal speakers coupled to the target UEs 1 . . . X or via external speakers, and so on. In another example, if the first set of configurations of the media from the transmitting UEs 1 . . . N includes a video portion from transmitting UE 2, the dynamic playback relevance information may indicate whether the target UEs 1 . . . X are presenting the video portion from transmitting UE 2 at all, a resolution at which the target UEs 1 . . . X are presenting the video portion from transmitting UE 2, a subset of the video portion from the transmitting UE 2 that is being presented with part of the video portion being excluded from presentation at the respective target UEs 1 . . . X, a frame rate at which the video portion from is being presented at the respective target UEs 1 . . . X, a frequency at which the target UEs 1 . . . X present the video portion from transmitting UE 2 to their users (e.g., once per minute for 5 seconds, etc.), and so on. Accordingly, the dynamic playback relevance information can convey current information with regard to which portions of the first set of configurations the media from transmitting UEs 1 . . . N are likely to be interacting with operators of the target UEs 1 . . . X, i.e., which portions are relevant in terms of playback at the respective target UEs 1 . . . X. By contrast, conventional playback information is related to the theoretical playback constraints of target UEs (e.g., a display screen resolution limit of target UEs, bandwidth constraints on a connection to target UEs, and so on) that do not actually convey real-time relevance or usage information that fall beneath these constraints.

Referring to 710A of FIG. 7, in an example where the dynamic playback relevance information includes a desired or preferred manner that the respective target UEs 1 . . . X wish to present the media feeds from their respective interlaced output feeds as in example (ii) of the dynamic playback relevance information for 710A, if the first set of configurations of the media from the transmitting UEs 1 . . . N includes a video portion from transmitting UE 3 at 720 p and a user of target UE 1 wants to present the video portion from transmitting UE 3 at 1080 p, the dynamic playback relevance information may request that the transmitting UE 3 (or the application server 170) increase the resolution of the video feed.

Referring to 710A of FIG. 7, in an example where the dynamic playback relevance information includes a request that a media feed from one or more of the transmitting UEs 1 . . . N be removed from its respective interlaced output feed as in example (iii) of the dynamic playback relevance information for 710A, if the first set of configurations of the media from the transmitting UEs 1 . . . N includes a video feed from transmitting UE 3 and a user of target UE 1 is not interested in presenting the video feed from transmitting UE 3, the dynamic playback relevance information may request that the session controller remove the transmitting UE 3's video feed from the media transmission to target UE 1. As will be appreciated, if a sufficient number of target UEs 1 . . . X indicate a lack of interest in transmitting UE 3's video feed, the transmitting UE 3 itself may be asked to stop transmitting its video feed to the session controller.

Referring to 710A of FIG. 7, in an example where the dynamic playback relevance information includes a request that one or more new media feeds be added into its respective interlaced output feed as in example (iv) of the dynamic playback relevance information for 710A, if the first set of configurations of the media from the transmitting UEs 1 . . . N includes a video feed from transmitting UE 3 and a user of target UE 1 the video feed from transmitting UE 3 is not part of the interlaced output feed to target UE 1, the dynamic playback relevant information may request that the session controller add or "turn on" the transmitting UE 3's video feed within target UE 3's interlaced output feed. In yet another example, a given target UE may indicate an interest in receiving a media feed from a UE that is not yet among the transmitting UEs 1 . . . N. In this case, the non-transmitting UE can be contacted by the session controller and asked to become a transmitting UE. If the contacted UE agrees to begin transmitting a media feed to the session controller, the session controller can begin to add the media feed from the new transmitting UE to the given target UE's interlaced output feed.

Referring to FIG. 7, the session controller receives the dynamic playback relevance information from target UEs 1 . . . X and determines a target lowest relevant configuration (LRC) for the interlaced output feeds being directed to each of target UEs 1 . . . X, 715A. The target LRC for a particular target UE includes portions of the media feeds from the transmitting UEs that are actually deemed relevant to at least one of the particular target UE while excluding portions of the media feeds from the transmitting UEs that are not deemed relevant. For example, if target UE 3 is on "mute", than an audio feed is not currently relevant to playback at the target UE 3, such that the LRC for target UE 3 may exclude audio feeds. The target LRC is used to interlace the media feeds from the transmitting UEs 1 . . . N into an updated set of X interlaced output feeds for transmission to the target UEs 1 . . . X, 720A. The updated set of X interlaced output feeds generated at 720A are then transmitted to the target UEs 1 . . . X at 725A.

In addition to updating the manner in which the media feeds from the transmitting UEs 1 . . . N are interlaced into the interlaced output feeds at the session controller, it is sometimes appropriate to change the manner in which the transmitting UEs 1 . . . N are capturing and/or transmitting media feeds to the session controller as well. For example, if the LRC for transmitting UE 1's video feed is below 480 p for each of targets 1 . . . X, then it is wasteful for the transmitting UE 1 to capture or transmit its video feed at 480 p or higher. Accordingly, the session controller optionally notifies the transmitting UEs 1 . . . N of the highest LRCs for their respective feeds, 730A. The transmitting UEs 1 . . . N receive the highest LRC notification and determine whether to update the manner in which the respective media feeds are being captured at and/or transmitted by the transmitting UEs 1 . . . N at 735A. If the transmitting UEs 1 . . . N determine not to update the first set of configurations for their media feeds at 735A, the process returns to 700A. Otherwise, if one or more of the transmitting UEs determine to update one or more of their respective media feeds based on the highest LRC information at 735A, the transmitting UEs 1 . . . N transmit media feeds with a second set of configurations to the session controller, 740A, whereby at least one of the media feeds with the second set of configurations at 730A is different than the media feeds with the first set of configurations from 700A. While not shown explicitly in FIG. 7, the interlaced output feeds are generated (e.g., in 720A) based on the media feeds with the second set of configurations after 740A.

Thus, the LRC information that is determined based on the dynamic playback relevant information may be used to constrain the manner in which the media feeds are transmitted to the target UEs 1 . . . X from the session controller (e.g., 720A through 725A of FIG. 7) and also, optionally, the manner in which the transmitting UEs 1 . . . N provide their respective media feeds to the session controller (e.g., 730A through 740A of FIG. 7).

Figure 8A:
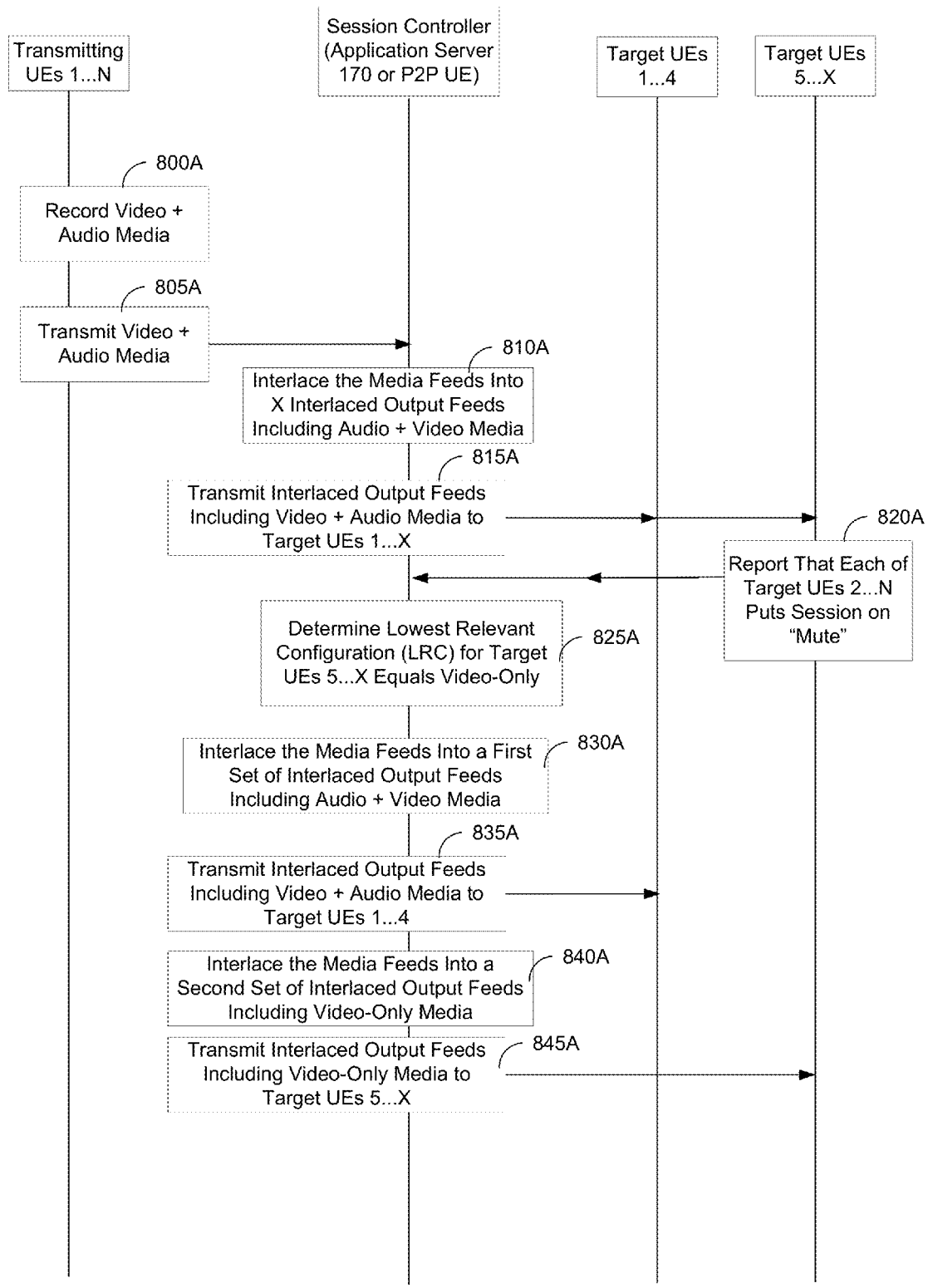
FIG. 8A illustrates an example implementation of the process of FIG. 7 in accordance with an embodiment of the invention.

FIG. 8A illustrates an example implementation of the process of FIG. 7 in accordance with an embodiment of the invention.

Referring to FIG. 8A, assume that a plurality of UEs are engaged in a group communication session with transmitting UEs 1 . . . N providing a set of media feeds to a session controller (e.g., the application server 170, or another local UE) for distribution to target UEs 1 . . . X. During the group communication session, assume that the transmitting UEs 1 . . . N each capture video and audio media, 800A, and that the transmitting UEs 1 . . . N each transmit the captured video and audio media as video and audio feeds to the session controller, 805A (e.g., similar to 700A of FIG. 7). The session controller interlaces the media feeds into X interlaced output feeds, with each of the X interlaced output feeds each including the video and audio feeds from at least one of the transmitting UEs 1 . . . N (e.g., such as multiple video feeds and a single representative audio feed), 810A (e.g., similar to 703A of FIG. 7), and the session controller transmits the X interlaced output feeds from 810A to the target UEs 1 . . . X, 815A (e.g., similar to 705A of FIG. 7A).

Referring to FIG. 8A, the target UEs 1 . . . X receive and present the interlaced output feeds (not shown), and target UEs 5 . . . X report their respective audio feeds are being muted, 820A (e.g., similar to 710A of FIG. 7, whereby the session mute indications correspond to the dynamic playback relevance information). The session controller receives the session-mute indications and determines that the LRC for target UEs 5 . . . X includes video but does not include audio because the audio media is not being played by any of the target UEs 5 . . . X, 825A (e.g., similar to 715A of FIG. 7). The session controller thereby continues to interlace both audio and video feeds into interlaced output feeds at 830A which are transmitted to target UEs 1 . . . 4, 835A. Also, based on the LRC for target UEs 5 . . . X, the session controller interlaces video feeds-only (no audio) into interlaced output feeds at 840A and then transmits the no-audio interlaced output feeds to the target UEs 5 . . . X at 845A.

Figure 8B:
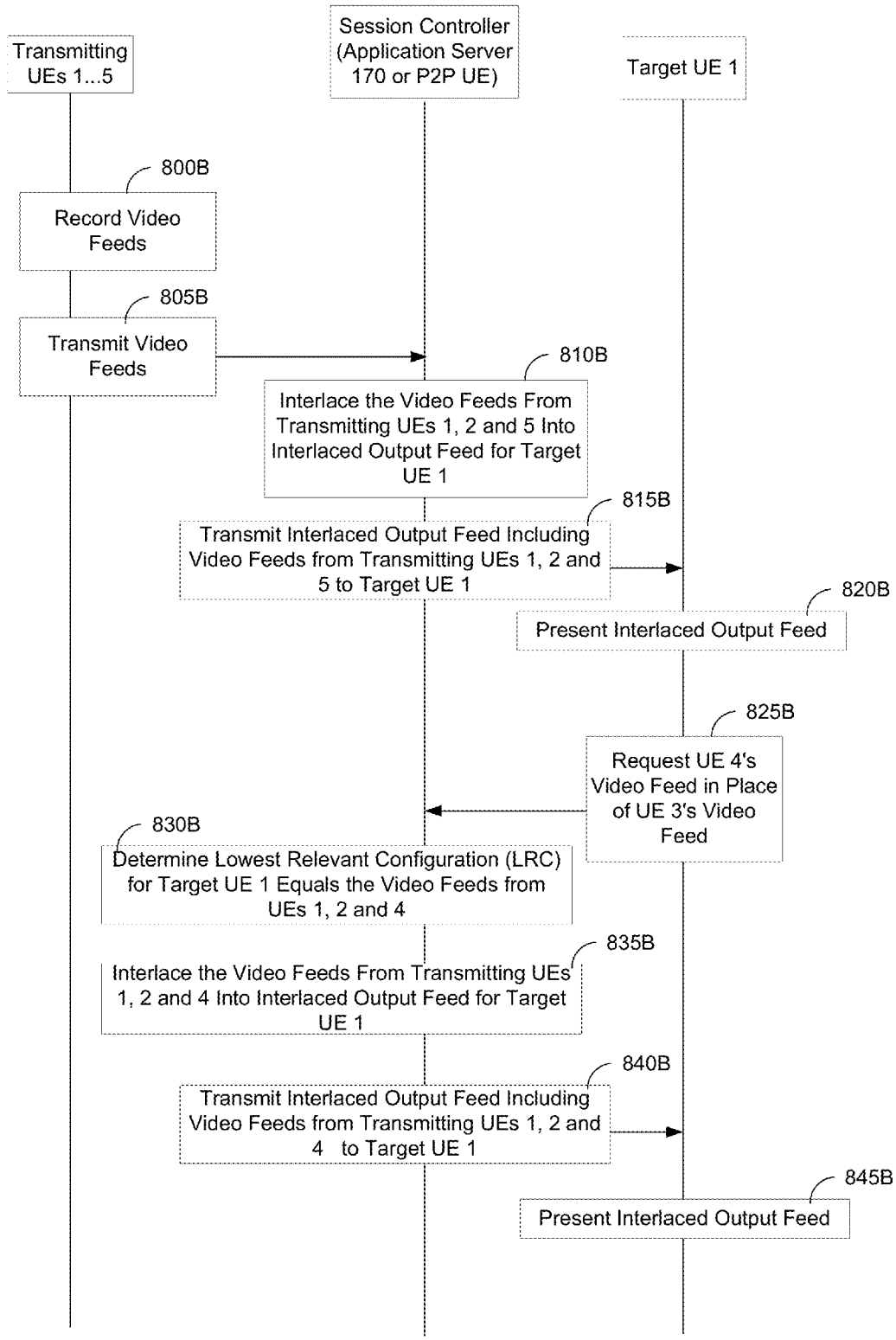
FIG. 8B illustrates another example implementation of the process of FIG. 7 in accordance with an embodiment of the invention.

FIG. 8B illustrates another example implementation of the process of FIG. 7 in accordance with an embodiment of the invention.

Figure 8C:
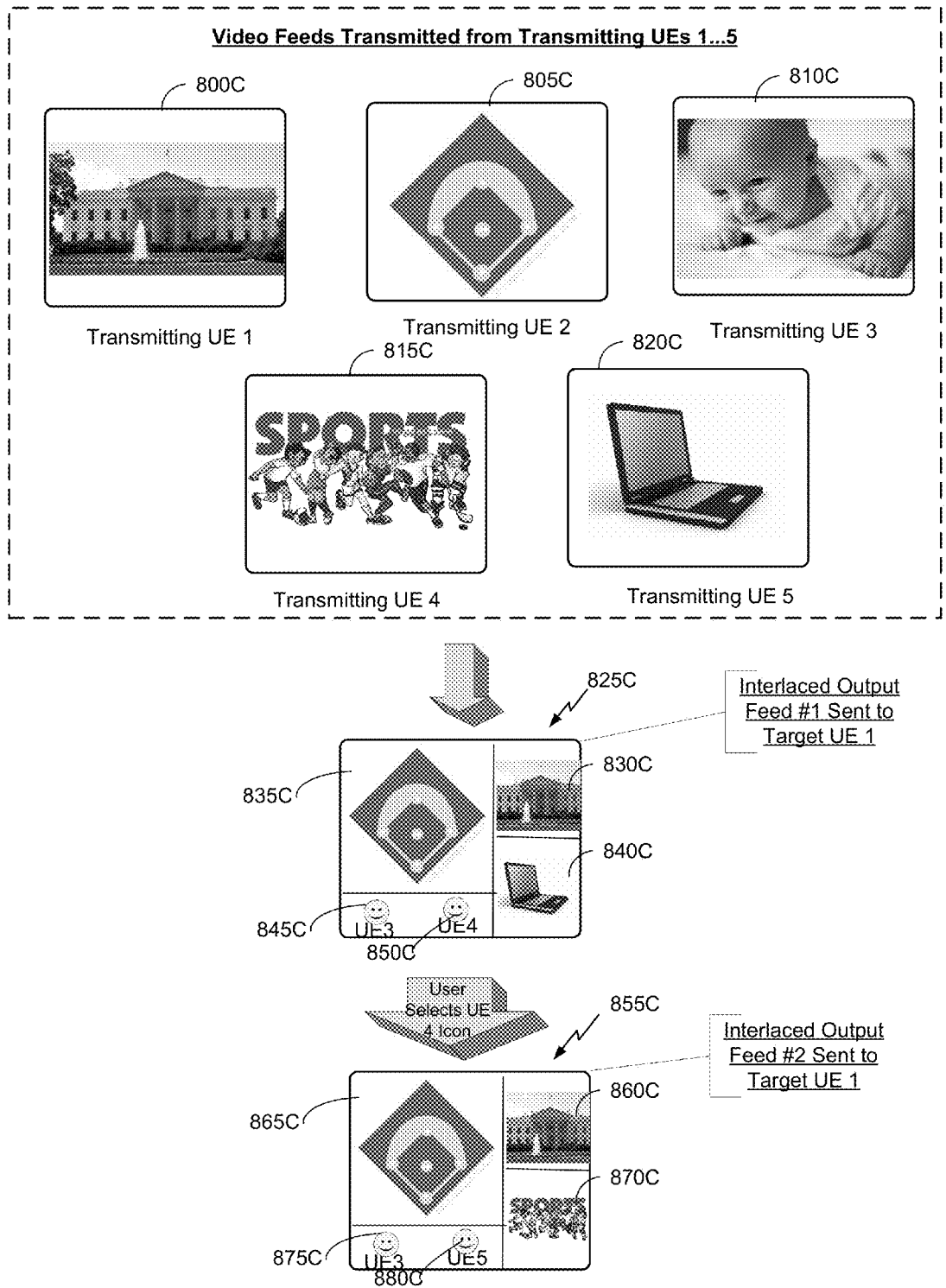
FIG. 8C illustrates examples of video feeds associated with the process of FIG. 8B in accordance with an embodiment of the invention.

Referring to FIG. 8B, assume that a plurality of UEs are engaged in a group communication session with transmitting UEs 1 . . . 5 providing a set of media feeds to a session controller (e.g., the application server 170, or another local UE) for distribution to at least one target UE ("target UE 1"). During the group communication session, assume that the transmitting UEs 1 ... 5 each capture video media, 800B, and that the transmitting UEs 1 ... 5 each transmit the captured video media as video feeds to the session controller, 805B (e.g., similar to 700A of FIG. 7). For example, FIG. 8C illustrates examples of the video feeds from the transmitting UEs 1 ... 5 as video feeds 800C through 820C, respectively. In FIG. 8C, video feed 800C from transmitting UE 1 corresponds to a video feed showing the White House, video feed 805C from transmitting UE 2 corresponds to a video feed showing a baseball field, video feed 810C from transmitting UE 3 corresponds to a video feed showing a baby, video feed 815C from transmitting UE 4 corresponds to a video feed showing sports and video feed 820C from transmitting UE 5 corresponds to a video feed showing a Laptop computer.

Returning to FIG. 8B, assume that the session controller interlaces the video feeds from the transmitting UEs 1, 2 and 5 into an interlaced output feed for distribution to the target UE 1, such that target UE 1's interlaced output feed omits the video feeds for the transmitting UEs 4 and 5, 810B (e.g., similar to 703A of FIG. 7). In an example, the session controller can execute decision logic to determine the initial allocation of video feeds to the corresponding interlaced output feeds for distribution to particular target UEs (e.g., based on user preferences of the target UEs, a perceived priority of the source video feeds, etc.). The session controller transmits the interlaced output feed from 810B to the target UE 1, 815B (e.g., similar to 705A of FIG. 7A). As will be appreciated, other interlaced output feeds could also be generated and transmitted to other target UEs, and FIG. 8B focuses upon a single target UE for convenience of explanation. An example of the interlaced output feed sent to target UE 1 at 815B of FIG. 8B is shown in FIG. 8C as interlaced output feed 825C, which includes the video feeds 800C, 805C and 820C from the transmitting UEs 1, 2 and 5 at portions 830C, 835C and 840C, respectively, of the interlaced output feed 825C. While the interlaced output feed 825C does not include the actual feeds 810C and 815C from the transmitting UEs 3 and 4, the interlaced output feed 825C is shown as including icons 845C and 850C that are representative of these video feeds, whereby selection of either icon at the target UE 1 prompts a request for the video feed associated with the selected icon to be added to the interlaced output feed 825C. Also, it will be appreciated that the interlaced output feed 825C has the video feed 805C from the transmitting UE 2 in the most prominent portion 835C, and that the portions 830C and 840C can be implemented as icons such that selection of one of these portions by the user of the target UE 1 can transition the corresponding video feed to the prominent portion.

Referring to FIG. 8B, the target UE 1 receives and presents the interlaced output feed, 820B. Next, assume that the target UE 1 transmits a request to the session controller for UE 4's video feed to be provided in the interlaced output feed in place of UE 3's video feed, 825B. As noted above, the request of 825B can be triggered responsive to a selection of UE 4's icon 850C within the interlaced output feed 825C. Responsive to the request of 825B, the session controller determines that the LRC for target UE 1 equals the video feeds from UEs 1, 2 and 4, 830B, and thereby interlaces the video feeds from the transmitting UEs 1, 2 and 4 into an interlaced output feed for distribution to the target UE 1, such that target UE 1's interlaced output feed omits the video feeds for the transmitting UEs 3 and 5, 835B. The session controller transmits the interlaced output feed from 835B to the target UE 1, 840B, and the target UE 1 presents the interlaced output feed, 845B. An example of the interlaced output feed sent to target UE 1 at 840B of FIG. 8B is shown in FIG. 8C as interlaced output feed 855C, which includes the video feeds 800C, 805C and 815C from the transmitting UEs 1, 2 and 5 at portions 860C, 865C and 870C, respectively, of the interlaced output feed 825C. While the interlaced output feed 855C does not include the actual feeds 810C and 820C from the transmitting UEs 3 and 5, the interlaced output feed 855C is shown as including icons 875C and 880C that are representative of these video feeds, whereby selection of either icon at the target UE 1 prompts a request for the video feed associated with the selected icon to be added to the interlaced output feed 855C. Also, it will be appreciated that the interlaced output feed 855C has the video feed 805C from the transmitting UE 2 in the most prominent portion 865C, and that the portions 860C and 870C can be implemented as icons such that selection of one of these portions by the user of the target UE 1 can transition the corresponding video feed to the prominent portion.

Figure 8D:
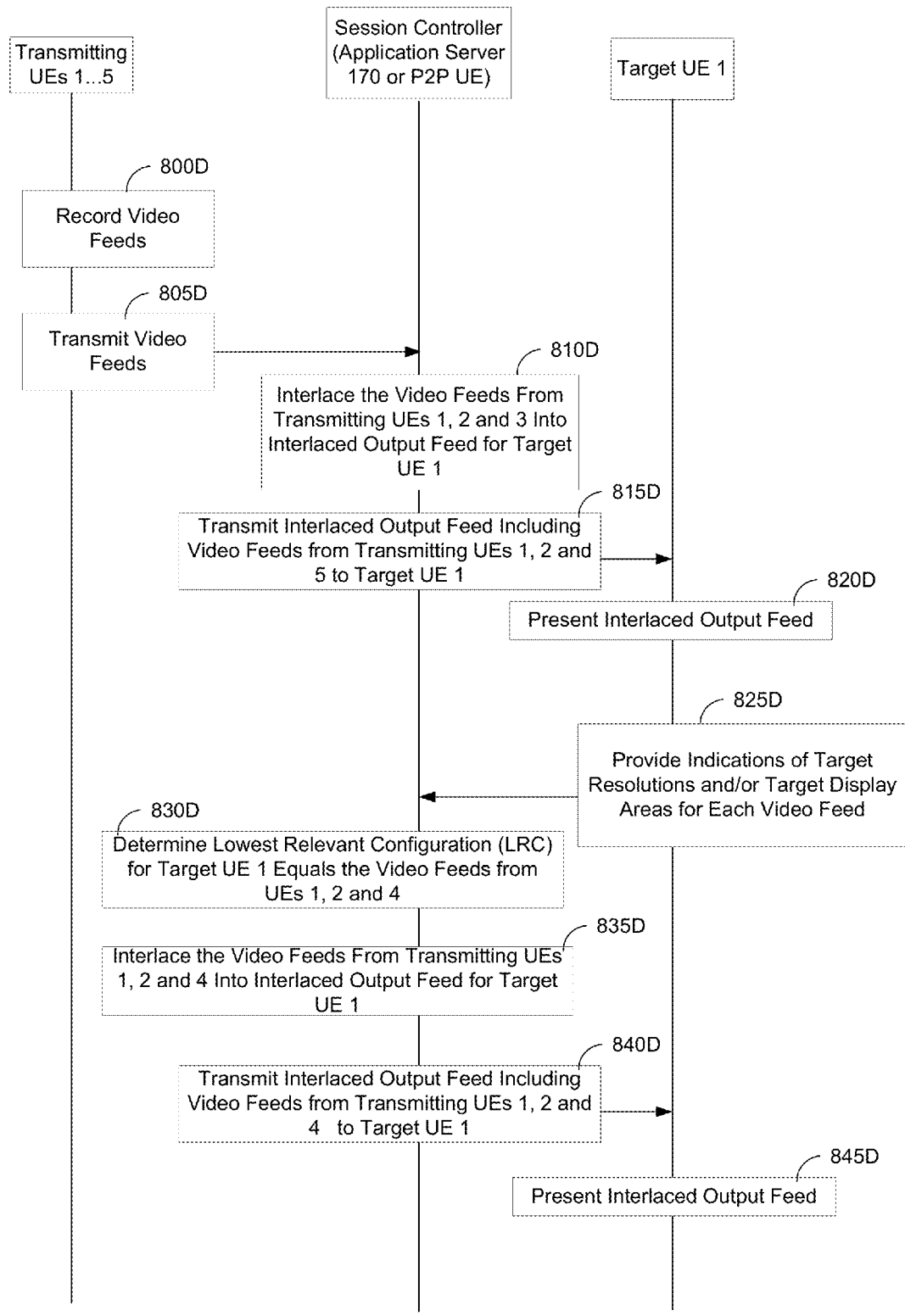
FIG. 8D illustrates another example implementation of the process of FIG. 7 in accordance with an embodiment of the invention.

FIG. 8D illustrates another example implementation of the process of FIG. 7 in accordance with an embodiment of the invention.

Figure 8E:
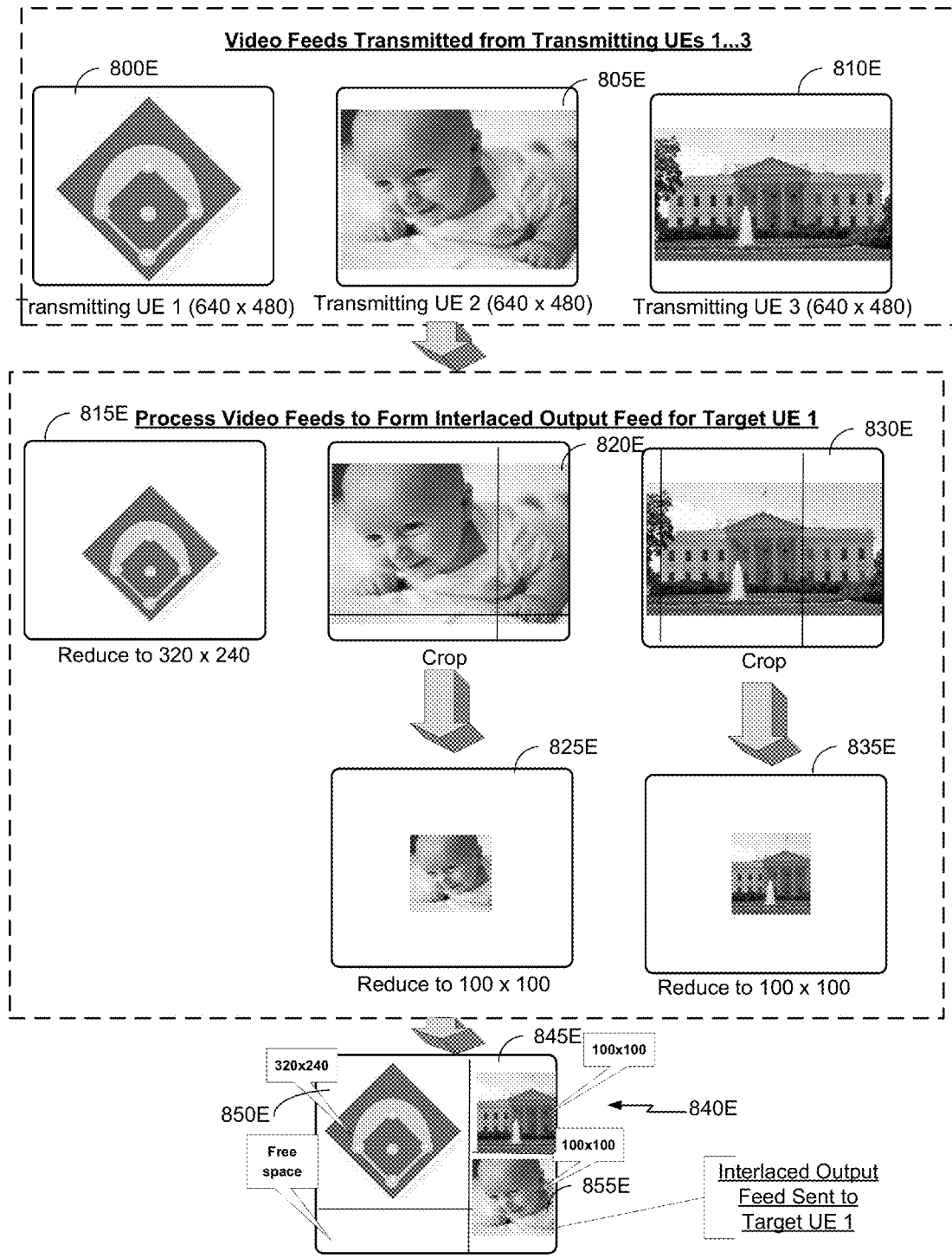
FIG. 8E illustrates examples of video feeds associated with the process of FIG. 8D in accordance with an embodiment of the invention.

Referring to FIG. 8D, assume that a plurality of UEs are engaged in a group communication session with transmitting UEs 1 ... 3 providing a set of media feeds to a session controller (e.g., the application server 170, or another local UE) for distribution to at least one target UE ("target UE 1"). During the group communication session, assume that the transmitting UEs 1 ... 3 each capture video media, 800D, and that the transmitting UEs 1 ... 3 each transmit the captured video media as video feeds to the session controller, 805D (e.g., similar to 700A of FIG. 7). For example, FIG. 8E illustrates examples of the video feeds from the transmitting UEs 1 ... 3 as video feeds 800E, 805E and 810E, respectively. In FIG. 8E, video feed 800E from transmitting UE 1 corresponds to a video feed with a resolution of 640×480 showing a baseball field, video feed 805E from transmitting UE 2 corresponds to a video feed with a resolution of 640×480 showing a baby, and video feed 810E from transmitting UE 3 corresponds to a video feed with a resolution of 640×480 showing the White House.

Returning to FIG. 8D assume that the session controller interlaces the video feeds from the transmitting UEs 1 ... 3 into an interlaced output feed for distribution to the target UE 1, 810D (e.g., similar to 703A of FIG. 7). In an example, the session controller can execute decision logic to determine the initial allocation of video feeds to the corresponding interlaced output feeds for distribution to particular target UEs (e.g., based on user preferences of the target UEs, a perceived priority of the source video feeds, etc.). In an example, "thumbnail" or reduced resolution portions of the respective video feeds can be interlaced into the interlaced output feed of 810D, or the respective video feeds can simply be interlaced at full resolution (at least initially). The session controller transmits the interlaced output feed from 810D to the target UE 1, 815D (e.g., similar to 705A of FIG. 7A). As will be appreciated, other interlaced output feeds could also be generated and transmitted to other target UEs, and FIG. 8D focuses upon a single target UE for convenience of explanation.

Referring to FIG. 8D, the target UE 1 receives and presents the interlaced output feed, 820D. Next, assume that the target UE 1 transmits indications of target resolutions and/or target display areas for each video feed in the interlaced output feed, 825D. For example, the target resolutions can correspond to the resolutions at which the respective video feeds in the interlaced output feed are being displayed at 820D, or a desired resolution for video feeds (e.g., which can theoretically be higher than the respective video feeds' current resolutions). Also, the target display areas can correspond to the display areas at which the respective video feeds in the interlaced output feed are being displayed at 820D (e.g., the user of target UE 1 has "zoomed in" on a particular sub-section of one or more of the video feeds), or a desired target display area for video feeds (e.g., which can theoretically expand beyond the current layout of the respective video feeds, or can be a sub-section of one or more of the video feeds so that the video feed can be modified to accommodate a zoom function).

Responsive to the transmission of 825D, the session controller determines that the LRC for target UE 1, 830D, and interlaces the video feeds from the transmitting UEs 1 . . . 3 into an interlaced output feed for distribution to the target UE 1, 835D. FIG. 8E illustrates an example of the LRC-based processing that occurs at 830D and 835D of FIG. 8D, whereby the LRC is determined to be a 320×240 version of the video feed 800E from the transmitting UE 1, a 100×100, cropped version of the video feed 805E from the transmitting UE 2 and a 100×100, cropped version of the video feed 810E from the transmitting UE 3. With these assumptions, the session controller downsizes the resolution of the video feed 800E to 320×240 at 815E, crops the video feed 805E at 820E and then downsizes the resolution of the cropped video feed 820E to 100×100 at 825E, crops the video feed 810E at 830E and then downsizes the resolution of the cropped video feed 830E to 100×100 at 835E. Once the target versions of each video feed are generated, an interlaced output feed 840E is populated with the respective target video feed versions shown at portions 845E, 850E and 855E, respectively. In particular, the 100×100, cropped video feed 835E from the transmitting UE 3 is shown at portion 845E, the 320×240 video feed 815E from the transmitting UE 1 is shown at portion 850E and the 100×100, cropped video feed 825E from the transmitting UE 2 is shown at portion 855E. The session controller transmits the interlaced output feed from 835D (e.g., 855E from FIG. 8E) to the target UE 1, 840D, and the target UE 1 presents the interlaced output feed, 845D.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of storing data, comprising:
joining, by a first user equipment (UE), a local communication session that is established between a plurality of geographically proximate UEs;
determining that the first UE is designated to record session data that is captured by a second UE and exchanged during a second portion of the local communication session;
recording by the first UE, the session data during the second portion of the local communication session based on determining that the first UE is designated to record session data;
receiving session data recorded by a third UE during a first portion of the local communication session;
establishing a connection to an access network after termination of the local communication session; and
uploading the recorded session data from the second portion of the local communication session and the received session data recorded by a third UE during first portion of the local communication session to a server over the established connection.

2. The method of claim 1,
wherein the first UE joins the local communication session after the local communication session is established, and
wherein the third UE is designated to record the session data that is captured by the second UE and exchanged during the first portion of the local communication session prior to the first UE joining the local communication session.

3. The method of claim 2, wherein the third UE is further designated to upload the recorded session data that is captured by the second UE to the server such that the server receives session data that is recorded at different ones of the plurality of geographically proximate UEs.

4. The method of claim 1, wherein the determining includes:
negotiating between the plurality of geographically proximate UEs to select a session recorder based on respective device capabilities of the plurality of geographically proximate UEs.

5. The method of claim 4, wherein the first UE is designated to record the session data captured by the second UE and any other UE among the plurality of geographically proximate UEs that transmits data during the local communication session based on the negotiation between the plurality of geographically proximate UEs.

6. The method of claim 4, wherein the respective device capabilities of the plurality of geographically proximate UEs include at least one of: a storage availability at the plurality of geographically proximate UEs; a type of access network to which the plurality of geographically proximate UEs are configured to connect; and a cost of network access for the plurality of geographically proximate UEs.

7. The method of claim 6, wherein negotiating between the plurality of geographically proximate UEs to select a session recorder comprises selecting the first UE as the session recorder based on at least one of: the first UE having a highest level of the storage availability among the plurality of geographically proximate UEs; the first UE being configured to connect to a fastest access network among the plurality of geographically proximate UEs; and the first UE being configured to connect to a cheapest access network among the plurality of geographically proximate UEs.

8. A first user equipment (UE) configured to store data, comprising:
means for joining a local communication session that is established between a plurality of geographically proximate UEs;
means for determining that the first UE is designated to record session data that is captured by a second UE and exchanged during a second portion of the local communication session;
means for recording the session data during the second portion of the local communication session based on determining that the first UE is designated to record session data;
means for receiving session data recorded by a third UE during a first portion of the local communication session;
means for establishing a connection to an access network after termination of the local communication session; and
means for uploading the recorded session data from the second portion of the local communication session and the received session data recorded by a third UE during the first portion of the local communication session to a server over the established connection.

9. A first user equipment (UE) configured to store data, comprising:
a processor configured with processor-executable instructions to perform operations comprising:
joining a local communication session that is established between a plurality of geographically proximate UEs;
determining that the first UE is designated to record session data that is captured by a second UE and exchanged during at least a second portion of the local communication session;
recording the session data during the second portion of the local communication session based on determining that the first UE is designated to record session data;
receiving session data recorded by a third UE during a first portion of the local communication session;
establishing a connection to an access network after termination of the local communication session; and
uploading the recorded session data from the second portion of the local communication session and the received session data recorded by a third UE during the first portion of the local communication session to a server over the established connection.

10. A non-transitory computer-readable medium having stored thereon processor-executable instructions, which, when executed by a processor of a first user equipment (UE) configured to store data, causes the first UE processor to perform operations comprising:
joining a local communication session that is established between a plurality of geographically proximate UEs;
determining that the first UE is designated to record session data that is captured by a second UE and exchanged during a second portion of the local communication session;
recording the session data during the second portion of the local communication session based on determining that the first UE is designated to record session data;
receiving session data recorded by a third UE during a first portion of the local communication session;
establishing a connection to an access network after termination of the local communication session; and
uploading the recorded session data from the second portion of the local communication session and the received session data recorded by a third UE during the first portion of the local communication session to a server over the established connection.

* * * * *